US012807271B2

(12) United States Patent
Hakamata et al.

(10) Patent No.: US 12,807,271 B2
(45) Date of Patent: Nov. 24, 2026

(54) DRIVE UNIT AND BICYCLE

(71) Applicant: YAMAHA HATSUDOKI KABUSHIKI KAISHA, Iwata (JP)

(72) Inventors: Yutaro Hakamata, Shizuoka (JP); Shota Hayashida, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 231 days.

(21) Appl. No.: 18/644,243

(22) Filed: Apr. 24, 2024

(65) Prior Publication Data

US 2024/0359772 A1 Oct. 31, 2024

(30) Foreign Application Priority Data

Apr. 25, 2023 (JP) ................................ 2023-071597

(51) Int. Cl.

*B62M 6/55* (2010.01)
*B62M 6/45* (2010.01)
*B62M 11/04* (2006.01)

(52) U.S. Cl.

CPC ................ *B62M 6/55* (2013.01); *B62M 6/45* (2013.01); *B62M 11/04* (2013.01)

(58) Field of Classification Search

CPC .......... B62M 6/55; B62M 6/45; B62M 11/00; B62M 11/04; B62M 11/145; B62M 11/02; B62M 11/14
USPC .................................. 180/206.2, 206.4, 220
See application file for complete search history.

(56) References Cited

U.S. PATENT DOCUMENTS

| | | | | |
|---|---|---|---|---|
| 5,570,752 | A | 11/1996 | Takata | |
| 9,227,695 | B2 * | 1/2016 | Liu | B62K 19/34 |
| 2017/0158284 | A1 * | 6/2017 | Hayslett | B62M 6/90 |
| 2019/0111998 | A1 | 4/2019 | Noda et al. | |
| 2019/0112000 | A1 * | 4/2019 | Noda | B62M 6/55 |
| 2019/0210690 | A1 * | 7/2019 | Huang | B62K 19/34 |
| 2021/0284283 | A1 * | 9/2021 | Cai | B62M 6/55 |

FOREIGN PATENT DOCUMENTS

| | | | |
|---|---|---|---|
| CN | 212766630 | U | 3/2021 |
| JP | 2019-073123 | A | 5/2019 |
| JP | 3239796 | U | 11/2022 |

OTHER PUBLICATIONS

"New Fazua Ride 60 Drive: Less Flexibility = More Success?", E-Bike News, https://www.ebike24.com/blog/ebike-drive-system-fazua-ride-60, Apr. 19, 2022, 3 pages.

* cited by examiner

*Primary Examiner* — Valentin Neacsu
*Assistant Examiner* — Morgan Knauf
(74) *Attorney, Agent, or Firm* — Keating & Bennett, LLP

(57) ABSTRACT

A drive unit for a bicycle includes a housing, a first speed reducer including an input shaft and an output shaft coaxial with each other to reduce rotation transmitted from an electric motor, a power transmission to which rotation of the output shaft of the first speed reducer is transmitted, and a second speed reducer to change a direction of an axis of rotation transmitted from the power transmission. The housing includes a single cylindrical first housing to support the first speed reducer and the power transmission without any housing other than the first housing being interposed therebetween.

24 Claims, 9 Drawing Sheets

DRIVE UNIT AND BICYCLE

CROSS REFERENCE TO RELATED APPLICATIONS

This application claims the benefit of priority to Japanese Patent Application No. 2023-071597 filed on Apr. 25, 2023. The entire contents of this application are hereby incorporated herein by reference.

BACKGROUND OF THE INVENTION

1. Field of the Invention

The present invention relates to drive units and bicycles.

2. Description of the Related Art

Bicycles, which are a daily means of transport, are popular among people regardless of age or gender. Electric power assisted bicycles with an electric motor used to assist the user's pedaling force have in recent years become widespread.

In the electric power assisted bicycle, the electric motor generates a drive force according to the user's pedaling force, which can reduce the efforts of the user when the user is traveling on a hill or carrying a payload, for example.

An electric power assisted bicycle is equipped with a drive unit including an electric motor and the like. Japanese Laid-Open Patent Publication No. 2019-073123 discloses a drive unit in which a direction of an axis of rotation of the electric motor intersects with that of the pedal crank shaft. Such a configuration can facilitate a reduction of the size of the drive unit compared to a drive unit in which the direction of the axis of rotation of the electric motor is parallel with that of the pedal crank shaft.

SUMMARY

There is a demand for an improvement in the power transmission efficiency of a drive unit.

Drive units and bicycles according to the following items are herein disclosed.

A drive unit for a bicycle includes an electric motor, a housing to accommodate the electric motor, a pedal crank shaft extending through the housing with a direction of an axis of rotation thereof intersecting with a direction of an axis of rotation of the electric motor, a first speed reducer including an input shaft and an output shaft coaxial with each other to reduce the rotation transmitted from the electric motor, a power transmission to which a rotation of the output shaft of the first speed reducer is transmitted, and a second speed reducer to change a direction of an axis of rotation transmitted from the power transmission, and to reduce a speed of the rotation from the power transmission, wherein the housing includes a plurality of housings including a single cylindrical first housing, and the single cylindrical first housing supports the first speed reducer and the power transmission without any housing other than the first housing being interposed therebetween.

According to an example embodiment of the present invention, the first speed reducer, to which the rotation of the electric motor is transmitted, and the power transmission, to which the rotation of the first speed reducer is transmitted, are both supported by the same single cylindrical first housing. As a result, an axial misalignment between the first speed reducer and the power transmission can be reduced. By reducing that axial misalignment, power transmission efficiency can be improved, and noise and vibration can be reduced. Such a structure having a reduced axial misalignment eliminates the need of increasing the design value of backlash, resulting in a further improvement in power transmission efficiency and a further reduction in noise and vibration.

In a drive unit described above, the power transmission includes a one-way clutch.

Because the first speed reducer and the power transmission are both supported by the same single cylindrical first housing, an axial misalignment of the one-way clutch can be reduced.

In a drive unit described above, the power transmission is able to transmit rotation transmitted from the output shaft of the first speed reducer to the second speed reducer without a reduction in a speed of the rotation.

The power transmission can be used to transmit the rotation of the first speed reducer to the second speed reducer.

In a drive unit described above, the plurality of housings include a single cylindrical second housing and a single cylindrical third housing, wherein the single cylindrical second housing supports the second speed reducer without any housing other than the second housing being interposed therebetween, and the single cylindrical third housing supports the first housing and the second housing without any housing other than the third housing being interposed therebetween.

The first housing, which supports the power transmission, and the second housing, which supports the second speed reducer, are supported by the same third housing. As a result, an axial misalignment between the power transmission and the second speed reducer can be reduced.

In a drive unit described above, the first housing and the third housing have a bell-and-spigot-joint structure in which at least a portion of an outer periphery of the first housing is fitted with a portion of an inner periphery of the third housing, and the second housing and the third housing have a bell-and-spigot-joint structure in which at least a portion of an outer periphery of the second housing is fitted with another portion of the inner periphery of the third housing.

The third housing includes a bell-and-spigot-joint structure between itself and each of the first housing and the second housing. As a result, an axial misalignment between the power transmission and the second speed reducer can be reduced.

In a drive unit described above, a male threaded portion is provided at a portion of an outer periphery of the first housing, a female threaded portion is provided at a portion of an inner periphery of the third housing, and the first housing and the third housing are connected together by the male threaded portion of the first housing being engaged with the female threaded portion of the third housing.

Fastening devices such as bolts that are exposed from an outer surface of the drive unit can be reduced, so that the unevenness of the outer surface of the drive unit can be reduced. As a result, the design flexibility of a frame of the bicycle, on which the drive unit is mounted, can be improved.

In a drive unit described above, the first housing and the third housing are in contact with each other in the direction of the axis of rotation of the electric motor.

As a result, the first housing, at which the male threaded portion is provided, and the third housing, at which the female threaded portion is provided, can be located in the direction of the axis of rotation of the electric motor.

In a drive unit described above, a male threaded portion is provided at a portion of an outer periphery of the second housing, a female threaded portion is provided at a portion of an inner periphery of the third housing, and the second housing and the third housing are connected together by the male threaded portion of the second housing being engaged with the female threaded portion of the third housing.

Fastening devices such as bolts that are exposed from an outer surface of the drive unit can be reduced, so that the unevenness of the outer surface of the drive unit can be reduced. As a result, the design flexibility of a frame of the bicycle, on which the drive unit is mounted, can be improved.

In a drive unit described above, the plurality of housings include a single cylindrical fourth housing supporting the input shaft of the first speed reducer without any housing other than the fourth housing being interposed therebetween, and the first housing and the fourth housing have a bell-and-spigot-joint structure in which at least a portion of an outer periphery of the first housing is fitted with at least a portion of an inner periphery of the fourth housing.

The first housing and the fourth housing have a bell-and-spigot-joint structure. As a result, an axial misalignment between the input shaft of the first speed reducer and the other elements of the first speed reducer can be reduced.

In a drive unit described above, a male threaded portion is provided at a portion of an outer periphery of the first housing, a female threaded portion is provided at a portion of an inner periphery of the fourth housing, and the first housing and the fourth housing are connected together by the male threaded portion of the first housing being engaged with the female threaded portion of the fourth housing.

Fastening devices such as bolts that are exposed from an outer surface of the drive unit can be reduced, so that the unevenness of the outer surface of the drive unit can be reduced. As a result, the design flexibility of a frame of the bicycle, on which the drive unit is mounted, can be improved.

In a drive unit described above, the first housing and the fourth housing are in contact with each other in the direction of the axis of rotation of the electric motor.

As a result, the first housing, at which the male threaded portion is provided, and the fourth housing, at which the female threaded portion is provided, can be located in the direction of the axis of rotation of the electric motor.

In a drive unit described above, the first speed reducer includes a planetary gear mechanism, the first housing supports a ring gear of the planetary gear mechanism, and the drive unit further includes a thrust washer between a planet gear of the planetary gear mechanism and the fourth housing in the direction of the axis of rotation of the electric motor.

As a result, when the planet gear is moved in the direction of the axis of rotation of the electric motor, a frictional force acting on the planet gear can be reduced, resulting in an improvement in mechanical efficiency. In addition, the amount of friction between the planet gear and the fourth housing can be reduced.

In a drive unit described above, the first speed reducer includes a planetary gear mechanism, the first housing supports a ring gear of the planetary gear mechanism, and the drive unit further includes a thrust washer between a planet carrier of the planetary gear mechanism and the power transmission in the direction of the axis of rotation of the electric motor.

Even when a difference in relative rotational speed occurs between the planet carrier and the power transmission, a frictional force generated between the planet carrier and the power transmission can be reduced. As a result, the loss of a human force can be reduced when the electric motor is not generating an assistance force.

In a drive unit described above, a portion of the thrust washer overlaps the one-way clutch in a plan view of the drive unit, or as viewed in a direction perpendicular to the direction of the axis of rotation of the electric motor.

As a result, a size of the drive unit in the direction of the axis of rotation of the electric motor can be reduced.

In a drive unit described above, the first housing supports the one-way clutch with bearings interposed therebetween, and a center position between the bearings in the direction of the axis of rotation of the electric motor coincides with a center position of the one-way clutch in the direction of the axis of rotation of the electric motor.

As a result, the one-way clutch can be stably supported, and therefore, the loss of a drive torque can be reduced, and the life of the one-way clutch can be extended.

In a drive unit described above, the second speed reducer includes a drive bevel gear to which the rotation of the power transmission is transmitted, and a driven bevel gear to which the rotation of the drive bevel gear is transmitted, and the second housing supports a rotating shaft of the drive bevel gear without any housing other than the second housing being interposed therebetween.

The direction of the axis of rotation transmitted from the power transmission can be changed using the bevel gears, and the speed of the rotation can be reduced.

In a drive unit described above, the drive unit further includes a shim between a lower end portion of the second housing and the third housing in the direction of the axis of rotation of the electric motor.

A position of the drive bevel gear can be adjusted using the shim.

In a drive unit described above, the drive unit further includes a coupling to transmit the rotation of the power transmission to the rotating shaft of the drive bevel gear.

An axial misalignment between the power transmission and the rotating shaft of the drive bevel gear can be accommodated by the coupling.

In a drive unit described above, the second housing supports the rotating shaft of the drive bevel gear with a first bearing interposed therebetween, and supports the coupling with a second bearing interposed therebetween, and the second housing further supports the rotating shaft of the drive bevel gear with the second bearing and the coupling interposed therebetween.

In a structure in which the coupling is provided, a size of the drive unit in the direction of the axis of rotation of the electric motor can be reduced.

A bicycle may include any drive unit described above.

In the bicycle thus described, noise and vibration generated in the drive unit can be reduced.

In a bicycle described above, the drive unit is attached to a frame of the bicycle at a location farther forward than a rear end portion of a wall around the pedal crank shaft of the housing.

As a result, the rear-center length of the bicycle (the distance between the pedal crank shaft and the rear wheel hub) can be reduced.

In a bicycle described above, the drive unit is attached to a frame of the bicycle at a location farther rearward than a rear end portion of a wall around the pedal crank shaft of the housing, and farther forward than a rear wheel of the bicycle.

The drive unit may be attached to the frame of the bicycle at a plurality of locations. A fastening portion may be located farther forward than the pedal crank shaft to fix the drive unit to the frame of the bicycle. In that case, another fastening portion is located farther rearward than the rear end portion of the wall around the pedal crank shaft of the housing, to fix the drive unit to the frame of the bicycle. As a result, the distance between these fastening portions can be increased, resulting in an increase in mounting rigidity.

A drive unit for a bicycle includes an electric motor, a housing to accommodate the electric motor, a pedal crank shaft extending through the housing with a direction of an axis of rotation thereof intersecting with a direction of an axis of rotation of the electric motor, a first speed reducer including an input shaft and an output shaft coaxial with each other to reduce rotation transmitted from the electric motor, a power transmission to which a rotation of the output shaft of the first speed reducer is transmitted, and a second speed reducer to change a direction of an axis of rotation transmitted from the power transmission, and to reduce the speed of the rotation from the power transmission, wherein the housing includes a single cylindrical first housing, a single cylindrical second housing, and a single cylindrical third housing, the single cylindrical first housing supports the power transmission without any housing other than the first housing being interposed therebetween, the single cylindrical second housing supports the second speed reducer without any housing other than the second housing being interposed therebetween, and the single cylindrical third housing supports the first housing and the second housing without any housing other than the third housing being interposed therebetween.

According to an example embodiment of the present invention, the first housing, which supports the power transmission, and the second housing, which supports the second speed reducer, are supported by the same single third housing. As a result, an axial misalignment between the power transmission and the second speed reducer can be reduced. By reducing that axial misalignment, power transmission efficiency can be improved, and noise and vibration can be reduced. By providing such a structure in which the axial misalignment is reduced, it is no longer necessary to increase the design value of backlash, resulting in a further improvement in power transmission efficiency and a further reduction in noise and vibration.

In a drive unit described above, the first housing and the third housing have a bell-and-spigot-joint structure in which at least a portion of an outer periphery of the first housing is fitted with a portion of an inner periphery of the third housing, and the second housing and the third housing have a bell-and-spigot-joint structure in which at least a portion of an outer periphery of the second housing is fitted with another portion of the inner periphery of the third housing.

The third housing includes a bell-and-spigot-joint structure between itself and each of the first housing and the second housing. As a result, an axial misalignment between the power transmission and the second speed reducer can be reduced.

In a drive unit described above, the drive unit further includes a coupling to transmit the rotation of the power transmission to the second speed reducer, wherein the second housing supports the coupling.

The coupling is supported by the second housing, which supports the second speed reducer. Therefore, in the structure in which the coupling is provided, a size of the drive unit in the direction of the axis of rotation of the electric motor can be reduced.

In a drive unit described above, the third housing supports the pedal crank shaft.

As a result, an axial misalignment between the second speed reducer and the pedal crank shaft can be reduced.

According to an example embodiment of the present invention, the first speed reducer, to which the rotation of the electric motor is transmitted, and the power transmission, to which the rotation of the first speed reducer is transmitted, are both supported by the same single cylindrical first housing. As a result, an axial misalignment between the first speed reducer and the power transmission can be reduced. By reducing that axial misalignment, power transmission efficiency can be improved, and noise and vibration can be reduced. Such a structure having a reduced axial misalignment eliminates the need of increasing the design value of backlash, resulting in a further improvement in power transmission efficiency and a further reduction in noise and vibration.

The above and other elements, features, steps, characteristics and advantages of the present invention will become more apparent from the following detailed description of the example embodiments with reference to the attached drawings.

DETAILED DESCRIPTION

Figure 1:
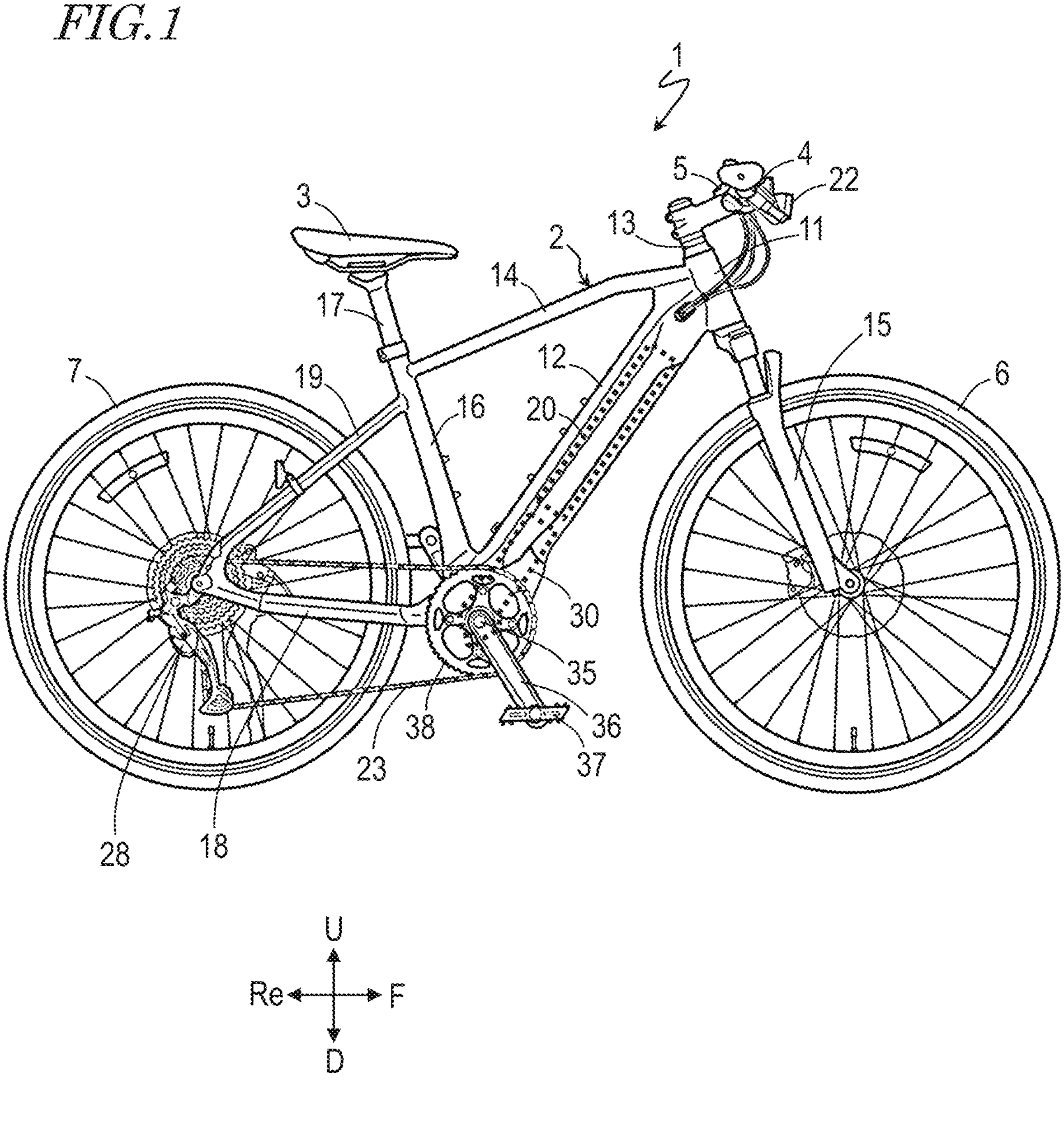
FIG. 1 is a right-side view illustrating an electric power assisted bicycle 1 according to an example embodiment of the present invention.

Drive units according to example embodiments of the present invention, and bicycles equipped with the drive units, will be described below with reference to the accompanying drawings. In the description of the example embodiments, like elements are indicated by like reference characters, and will not redundantly be described. The reference signs F, Re, L, R, U, and D shown in the drawings denote forward, rearward, leftward, rightward, upward, and downward, respectively. As used herein, the terms "front" and "forward," "rear" and "rearward," "left" and "leftward," "right" and "rightward," "upper" and "upward," and "lower"

and "downward" each have a meaning that is defined in relation to a rider who is sitting on the seat (saddle) of a bicycle, facing the handlebar. In the example embodiments below, an electric power assisted bicycle is illustrated as an example of a bicycle. The example embodiments below are merely for illustrative purposes, and the present invention is in no way intended to be limited to the example embodiments below.

FIG. 1 is a right-side view illustrating an electric power assisted bicycle 1 according to an example embodiment.

The electric power assisted bicycle 1 includes a body frame 2 that extends in a front-rear direction (forward and rearward). The body frame 2 includes a head tube 11, a down tube 12, a top tube 14, a seat tube 16, a chain stay 18, and a seat stay 19. The head tube 11 is disposed at a front end of the body frame 2. A steering tube 13 is rotatably inserted in the head tube 11. A handlebar 4 is fixed to the steering tube 13. A cyclometer unit 5 that displays various pieces of information related to the electric power assisted bicycle 1 is provided on the handlebar 4. A headlight 22 is provided in front of the handlebar 4.

A front fork 15 is fixed to a lower end portion of the steering tube 13. A lower end portion of the front fork 15 rotatably supports a front wheel 6, which is a steer wheel.

The down tube 12 extends diagonally downward and rearward from the head tube 11. The seat tube 16 extends upward from a rear end portion of the down tube 12. The chain stay 18 extends rearward from a lower end portion of the seat tube 16. The top tube 14 connects the head tube 11 and an upper portion of the seat tube 16 together. A seat post 17 is inserted in the seat tube 16. A saddle 3 that a rider sits on is provided at an upper end portion of the seat post 17.

A rear end portion of the chain stay 18 rotatably supports a rear wheel 7, which is a drive wheel. The seat stay 19 extends diagonally downward and rearward from an upper portion of the seat tube 16. A lower end portion of the seat stay 19 is connected to a rear end portion of the chain stay 18. A derailleur 28 for changing gear ratios is provided at a rear end portion of the chain stay 18. A derailleur may be provided around a pedal crank shaft 35.

A drive unit 30 and a battery unit 20 are mounted to the down tube 12. In the example illustrated in FIG. 1, the battery unit 20 is mounted in the down tube 12. A portion of the drive unit 30 is located in the down tube 12. The down tube 12 may have a hollow shape. At least a portion of the down tube 12 may have a U-shaped cross-section, and may have a cover that covers the U-shaped portion.

Figure 2:
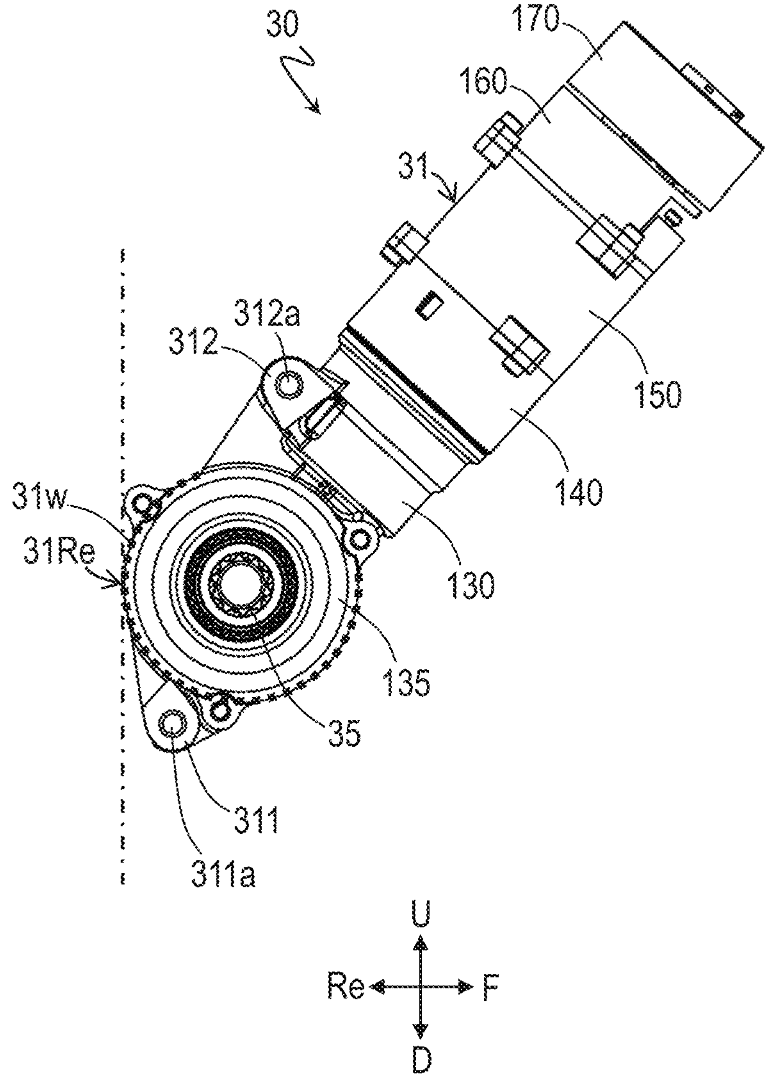
FIG. 2 is a right-side view illustrating a drive unit 30 according to an example embodiment of the present invention.

FIG. 2 is a right-side view illustrating the drive unit 30. The drive unit 30 includes a housing 31 and a pedal crank shaft 35. The housing 31 contains an electric motor, a motor control unit (MCU), a speed reducer, and the like. The pedal crank shaft 35 is supported by the drive unit 30, laterally extending through the drive unit 30. A crank arm 36 is provided at either end portion of the pedal crank shaft 35 (FIG. 1). A pedal 37 is rotatably provided at a tip of each crank arm 36.

The housing 31 includes protruding portions 311 and 312. The drive unit 30 is fixed to the body frame 2 using fastening devices such as bolts that are inserted into holes 311*a* and 312*a* of the protruding portions 311 and 312. The protruding portions 311 and 312 are located farther forward than a rear end portion 31Re of a wall portion 31*w* (indicated by a dotted line in FIG. 2) around the pedal crank shaft 35 of the housing 31. In other words, the drive unit 30 is fixed to the body frame 2 at a position farther forward than the rear end portion 31Re. Because the fastening device to fasten the drive unit 30 to the body frame 2 is not located farther rearward than the rear end portion 31Re, the rear-center length (chainstay length) of the bicycle 1 (i.e., the distance between the pedal crank shaft 35 and the rear hub of the rear wheel 7) can be reduced.

Figure 3:
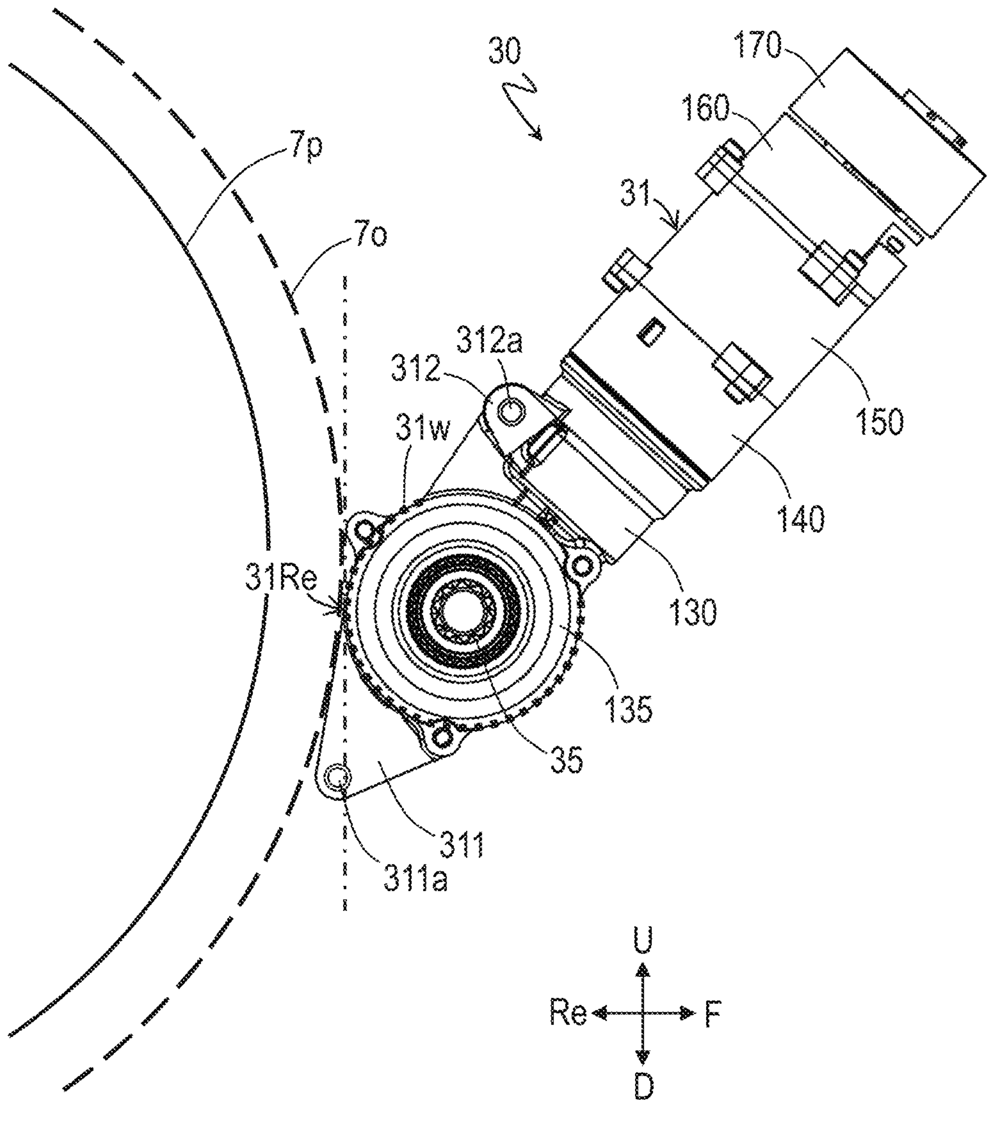
FIG. 3 is a right-side view illustrating another example of a drive unit 30 according to an example embodiment of the present invention.

It should be noted that the protruding portion 311 may be located farther rearward than the rear end portion 31Re of the wall portion 31*w*. FIG. 3 is a right-side view illustrating the drive unit 30 in which the protruding portion 311 extends farther rearward than the rear end portion 31Re.

In the example illustrated in FIG. 3, the hole 311*a* of the protruding portion 311 is located farther rearward than the rear end portion 31Re and farther forward than the rear wheel 7 of the bicycle 1. The drive unit 30 is fastened to the body frame 2 of the bicycle 1 at the position of the hole 311*a*. The drive unit 30 may be fastened to the frame 2 of the bicycle 1 at a plurality of positions. The protruding portion 312 is located farther forward than the pedal crank shaft 35. The drive unit 30 is fixed to the frame 2 of the bicycle 1 using the protruding portion 312. In this case, the drive unit 30 is fixed to the frame 2 of the bicycle 1 using the protruding portion 311 with the protruding portion 311 located farther rearward than the rear end portion 31Re of the wall portion 31*w*. As a result, the distance between the two fastening portions can be increased such that mounting rigidity can be enhanced.

Even in the case in which the protruding portion 311 extends rearward, if the protruding portion 311 is located farther forward than a position (offset) 7*o* that is a predetermined distance away from an outer periphery 7*p* of the rear wheel 7, an increase in the rear-center length of the bicycle 1 can be reduced.

In the above example, the hole 311*a*, which serves as the location of a fastening portion, is located farther forward than the rear end portion 31Re. Alternatively, a portion of the protruding portion 311 may be located farther rearward than the rear end portion 31Re. In the case in which the protruding portion 311 includes the hole 311*a*, some wall thickness needs to be provided around the hole 311*a*. A portion of the protruding portion 311 may protrude rearward from the rear end portion 31Re by the wall thickness. In the case in which a portion of the protruding portion 311 is located farther rearward than the rear end portion 31Re, the hole 311*a* may be provided at the same position as that of the rear end portion 31Re in the front-rear direction, or farther rearward than the rear end portion 31Re. If the hole 311*a* is located as rearward as possible, the distance between the two fastening portions can be increased such that mounting rigidity can be enhanced.

In the examples illustrated in FIGS. 2 and 3, the hole 311*a* of the protruding portion 311 is located below the position of the center of rotation of the pedal crank shaft 35. Alternatively, the hole 311*a* of the protruding portion 311 may be located above the position of the center of rotation of the pedal crank shaft 35. In that case, the protruding portion 312 may be located on the lower side of the housing 31. Even in the case in which the protruding portion 311 extends diagonally upward with respect to the pedal crank shaft 35, if the protruding portion 311 is located farther forward than the rear end portion 31Re of the wall portion 31*w*, the rear-center length of the bicycle 1 can be reduced. In addition, even in the case in which the protruding portion 311 extends farther rearward than the rear end portion 31Re, if the protruding portion 311 is located farther forward than the position 7*o* that is a predetermined distance away from the outer periphery 7*p* of the rear wheel 7, an increase in the rear-center length of the bicycle 1 can be reduced. If the hole

311*a* is located as rearward as possible, the distance between the two fastening portions can be increased such that mounting rigidity can be enhanced.

The battery unit 20 supplies power to the drive unit 30. The battery unit 20 includes a battery and a battery management system (BMS). The battery is rechargeable. The BMS controls the charge and discharge of the battery, and monitors the output current, state of charge, and the like of the battery. The battery unit 20 may be mounted on the seat tube 16. The battery unit 20 may be detachably attached to the electric power assisted bicycle 1.

The MCU of the drive unit 30 controls an operation of the electric motor, and an operation of each element of the electric power assisted bicycle 1. The MCU may include a semiconductor integrated circuit such as a processor, and a motor drive circuit. The rotation of the crank shaft 35 generated by the rider pushing the pedals 37 by his/her feet is transmitted to the rear wheel 7 through a chain 23. The MCU controls the electric motor so that the electric motor generates drive assistance power according to the rotation power of the crank shaft 35. The assistance power generated by the electric motor is transmitted to the rear wheel 7 through the chain 23. A belt, shaft, or the like may be used instead of the chain 23.

Figure 4:
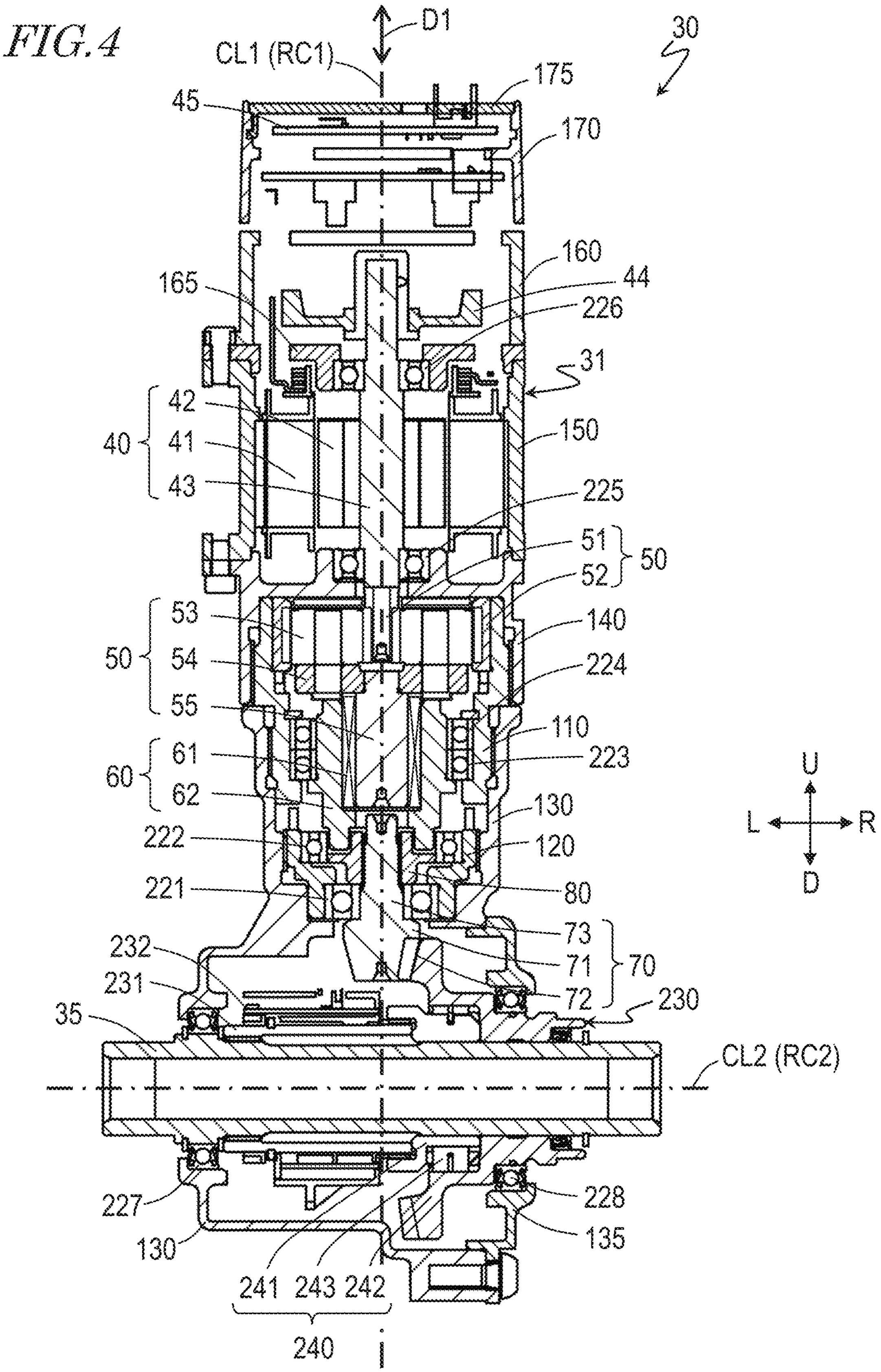
FIG. 4 is a cross-sectional view illustrating an internal structure of a drive unit 30 according to an example embodiment of the present invention.
Figure 5:
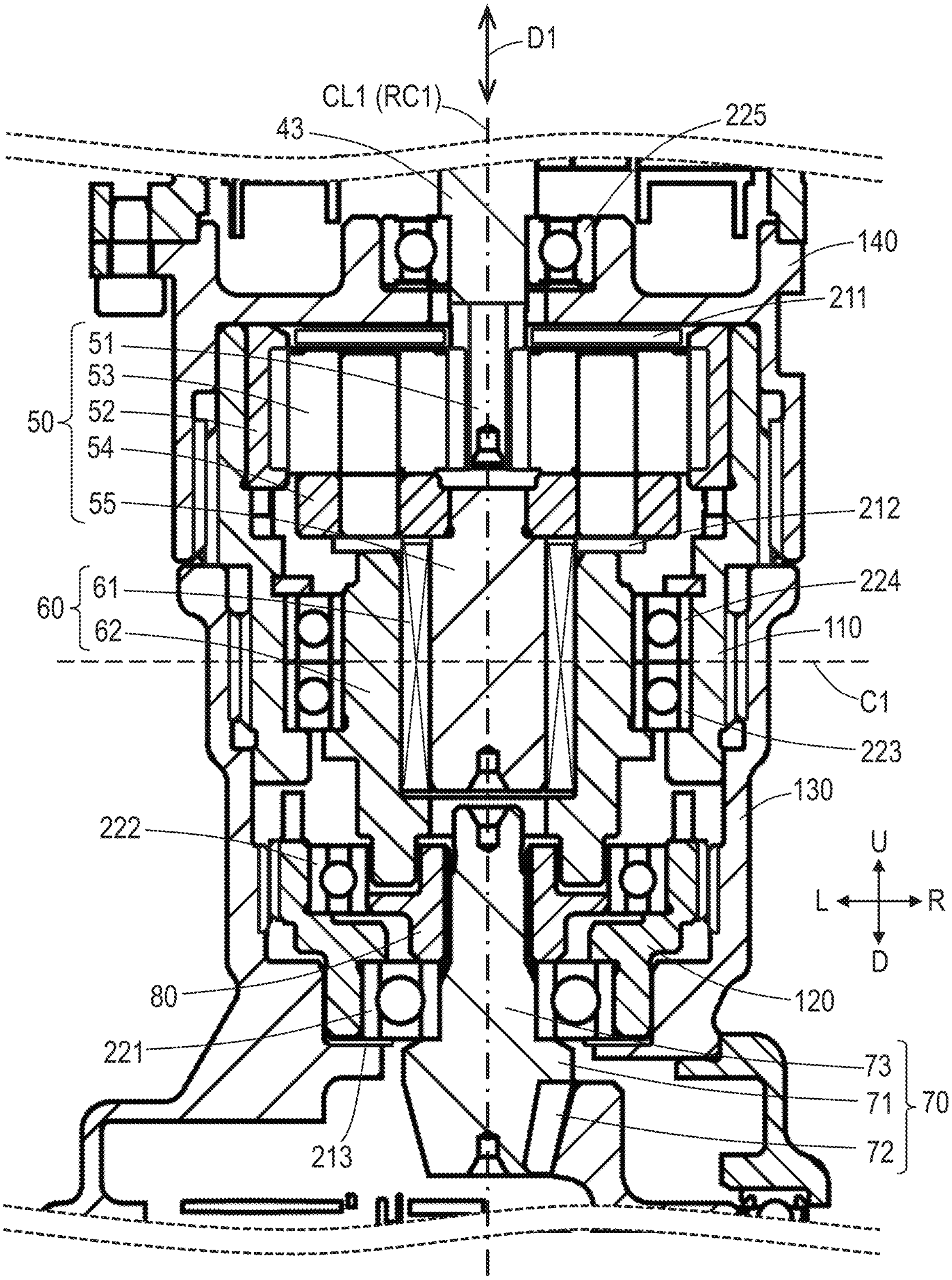
FIG. 5 is an enlarged cross-sectional view illustrating a portion of an internal structure of a drive unit 30 according to an example embodiment of the present invention.

FIG. 4 is a cross-sectional view illustrating an internal structure of the drive unit 30. FIG. 5 is an enlarged cross-sectional view illustrating a portion of the internal structure of the drive unit 30. The drive unit 30 includes a housing 31, an electric motor 40, a first speed reducer 50, a power transmission 60, a second speed reducer 70, a pedal crank shaft 35, and a rotating shaft 230. For the sake of convenience, in the following description of the structure of the drive unit 30, the direction D1 of the axis of rotation of the electric motor 40 is referred to as a top-bottom direction.

The housing 31 includes a first housing 110, a second housing 120, a third housing 130, a fourth housing 140, a fifth housing 150, a sixth housing 160, a seventh housing 170, a cover 135, an inner cover 165, and a cover 175. These elements of the housing 31 are preferably made of a metal material (e.g., an aluminum alloy).

Each of the first to seventh housings 110 to 170 has a tubular shape. The fourth housing 140 and the fifth housing 150 are fixed together using, for example, a fastening device. The fifth housing 150, the inner cover 165, and the sixth housing 160 are fixed together using, for example, a fastening device. The sixth housing 160 and the seventh housing 170 are fixed together using, for example, a fastening device. The seventh housing 170 and the cover 175 are fixed together using, for example, a fastening device.

The electric motor 40 is disposed in the fifth housing 150, and is fixed to the fifth housing 150. The electric motor 40 generates a drive force to assist the electric power assisted bicycle 1 during traveling. The electric motor 40 includes a stator 41 and a rotor 42. The stator 41 includes a plurality of bobbins around which a wire is wound into a coil. An iron core is inserted in each bobbin. The stator 41 is fixed to an inner periphery of the fifth housing 150. The stator 41 is fixed to the inner periphery of the fifth housing 150 by, for example, shrink fitting.

The rotor 42 is disposed inward of the stator 41. An outer peripheral surface of the rotor 42 is magnetized such that the north and south poles alternate in a circumferential direction. The rotor 42 includes an output shaft 43. The output shaft 43 is fixed to the body of the rotor 42 and rotates along with the body of the rotor 42. The center axis line CL1 of the output shaft 43 coincides with the center axis of rotation RC1 of the rotor 42 as viewed in the direction of the axis of the output shaft 43.

The fourth housing 140 is disposed below the fifth housing 150. The fourth housing 140 supports the output shaft 43 with a bearing 225 interposed therebetween. The fourth housing 140 supports the output shaft 43 without any housing other than the fourth housing 140 being interposed therebetween. The inner cover 165 is disposed above the fifth housing 150. The inner cover 165 supports the output shaft 43 with a bearing 226 interposed therebetween. A control circuit board 45 on which a rotation sensor (encoder) 44 to detect the rotation of the output shaft 43 and an MCU are provided is disposed in the sixth housing 160 and the seventh housing 170, which are located above the inner cover 165. The cover 175 covers an upper portion of the seventh housing 170.

An upper portion of the first housing 110 is disposed in the fourth housing 140. A method of fixing the first housing 110 and the fourth housing 140 together is described below. A lower portion of the first housing 110 is disposed in an upper portion of the third housing 130. A method of fixing the first housing 110 and the third housing 130 together is described below. The second housing 120 is disposed in the third housing 130 below the first housing 110. A method of fixing the second housing 120 and the third housing 130 together is described below.

The first speed reducer 50 is disposed in the first housing 110. The first speed reducer 50 reduces rotation transmitted from the electric motor 40. The first speed reducer 50 includes coaxial input and output shafts. The first speed reducer 50 includes, for example, a planetary gear mechanism. An example in which the first speed reducer 50 includes a planetary gear mechanism will now be described.

The first speed reducer 50 includes a sun gear 51, a ring gear (internal gear) 52, a planet gear 53, a planet carrier 54, and an output shaft 55. The configuration of a planetary gear mechanism is known and therefore will not be described in detail.

The sun gear 51 is provided below the output shaft 43 of the electric motor 40. The output shaft 43 of the electric motor 40 also serves as the input shaft of the first speed reducer 50. The ring gear 52 is supported by the first housing 110. The ring gear 52 is supported by the first housing 110 in such a manner that the ring gear 52 does not rotate relative to the first housing 110 by, for example, an uneven structure. The output shaft 55 is fixed to the planet carrier 54, and rotates along with the planet carrier 54. The planet carrier 54 and the output shaft 55 are fixed together by, for example, interference fitting. The output shaft 43 and the output shaft 55 are coaxial.

The power transmission 60, to which the rotation of the output shaft 55 is transmitted, is disposed below the first speed reducer 50. The power transmission 60 includes, for example, a one-way clutch. The power transmission 60 includes a one-way clutch mechanism 61 and an outer member 62. The output shaft 55 of the first speed reducer 50 is disposed on an inner periphery of the one-way clutch mechanism 61, so that the rotation of the output shaft 55 is transmitted to the one-way clutch mechanism 61. The output shaft 55 also serves as an inner member disposed on the inner periphery of the one-way clutch mechanism 61. The outer member 62 has a tubular shape. An inner periphery of the outer member 62 is fixed to an outer periphery of the one-way clutch mechanism 61. The first housing 110 supports the outer member 62 with bearings 223 and 224 interposed therebetween.

The output shaft 55 and the outer member 62 are joined together by the one-way clutch mechanism 61. The one-way clutch mechanism 61 limits the rotation of the outer member 62 relative to the output shaft 55 to one direction. The one-way clutch mechanism 61 includes, for example, a ratchet mechanism. The rotation of the output shaft 55 that causes the rear wheel 7 (FIG. 1) of the electric power assisted bicycle 1 to rotate forward is transmitted to the outer member 62 through the one-way clutch mechanism 61, while the rotation of the output shaft 55 that tries to cause the rear wheel 7 to rotate rearward is not transmitted to the outer member 62. In addition, the one-way clutch mechanism 61 prevents the forward rotation of the pedal crank shaft 35 generated by the rider from being transmitted to the electric motor 40.

The second speed reducer 70, to which the rotation of the power transmission 60 is transmitted, is disposed below the power transmission 60. The power transmission 60 can transmit rotation transmitted from the output shaft 55 of the first speed reducer 50, to the second speed reducer 70, without a reduction in the speed of the rotation. The second speed reducer 70 changes the direction of the axis of rotation transmitted from the power transmission 60, and reduces the speed of the rotation. The second speed reducer 70 includes a drive bevel gear 71 to which the rotation of the power transmission 60 is transmitted, and a driven bevel gear 72 to which the rotation of the drive bevel gear 71 is transmitted. When rotation is transmitted from the drive bevel gear 71 to the driven bevel gear 72, the direction of the axis of rotation is changed. In this example, the direction of the axis of rotation of the drive bevel gear 71 is parallel or substantially parallel with a top-bottom direction, and the direction of the axis of rotation of the driven bevel gear 72 is parallel or substantially parallel with a left-right direction. The top-bottom direction is parallel or substantially parallel with the direction D1 of the axis of rotation of the electric motor 40.

A configuration around the pedal crank shaft 35 will now be described. The direction of the axis of rotation of the pedal crank shaft 35 intersects with the direction D1 of the axis of rotation of the electric motor 40. The pedal crank shaft 35 is rotatably supported by the housing 31, extending through the housing 31 in the left-right direction. The center axis line CL2 of the pedal crank shaft 35 extends in the left-right direction. The center axis line CL2 is the center axis of rotation RC2 of the pedal crank shaft 35 as viewed in the axial direction (thrust direction) of the pedal crank shaft 35.

The pedal crank shaft 35 is rotatably supported by the third housing 130. The cover 135 covers a right portion of the third housing 130. The third housing 130 and the cover 135 are fixed together using, for example, a fastening device. The pedal crank shaft 35 is supported by the third housing 130 with a bearing 227 interposed therebetween. The pedal crank shaft 35 is also supported by the cover 135 with a bearing 228 interposed therebetween. A pair of left and right crank arms 36 (FIG. 1) are connected to the pedal crank shaft 35. A pedal 37 is connected to each crank arm 36.

The pedal crank shaft 35 extends through the rotating shaft 230. The rotating shaft 230 and the pedal crank shaft 35, which are coaxial, can rotate together. The rotating shaft 230 includes a linking shaft 231 and a one-way clutch 240.

The linking shaft 231 has a cylindrical shape. The pedal crank shaft 35 is inserted in the linking shaft 231. The linking shaft 231 and the pedal crank shaft 35 are coaxial.

A left end portion of the linking shaft 231 is linked to the pedal crank shaft 35 by serration fitting or the like. The linking shaft 231 rotates along with the pedal crank shaft 35 when the pedal crank shaft 35 rotates, no matter whether the pedal crank shaft 35 rotates forward or rearward.

A torque detection device 232 is disposed around the linking shaft 231. The torque detection device 232 detects a torque that is generated at the linking shaft 231 when the rider pushes the pedals. The torque detection device 232 includes, for example, a magnetostrictive torque sensor. The torque detection device 232 outputs a signal corresponding to the detected torque to the control circuit board 45. The MCU recognizes the rider's pedaling state with reference to the torque detected by the torque detection device 232, and controls an operation of the electric motor 40.

The one-way clutch 240 and the pedal crank shaft 35 are coaxial. The one-way clutch 240 includes an inner member 241, an outer member 242, and a one-way clutch mechanism 243. The inner member 241 has a cylindrical shape. A right portion of the linking shaft 231 is inserted in the inner member 241. The inner member 241 and the linking shaft 231 are coaxial. The right portion of the linking shaft 231 is linked to the inner member 241 by serration fitting or the like. The inner member 241 rotates along with the linking shaft 231 when the linking shaft 231 rotates, no matter whether the linking shaft 231 rotates forward or rearward. In other words, the inner member 241 rotates along with the pedal crank shaft 35 when the pedal crank shaft 35 rotates, no matter whether the pedal crank shaft 35 rotates forward or rearward.

The outer member 242 has a cylindrical shape. The pedal crank shaft 35 is inserted in the outer member 242. A slide bearing may be disposed between the outer member 242 and the pedal crank shaft 35. The outer member 242 and the pedal crank shaft 35 are coaxial. The outer member 242 can rotate relative to the pedal crank shaft 35.

The one-way clutch mechanism 243 includes, for example, a ratchet mechanism. The forward rotation of the inner member 241 is transmitted to the outer member 242, while the rearward rotation of the inner member 241 is not transmitted to the outer member 242. A forward rotary force of the outer member 242 generated by the electric motor 40 is not transmitted to the inner member 241.

The outer member 242 is supported by the bearing 228 in a manner that allows the outer member 242 to rotate relative to the housing 31 around the center axis line CL2 of the pedal crank shaft 35. The outer member 242 extends through the cover 135. A drive sprocket 38 (FIG. 1) is connected to a portion of the outer member 242 that is located outward (rightward) of the housing 31.

The outer member 242 includes the driven bevel gear 72. The driven bevel gear 72 is provided on the pedal crank shaft 35 with the one-way clutch 240 and the linking shaft 231 interposed therebetween. The driven bevel gear 72 has a diameter greater than that of the drive bevel gear 71, and has a greater number of teeth than those of the drive bevel gear 71. The driven bevel gear 72 has a rotational speed lower than that of the drive bevel gear 71. The engagement of the drive bevel gear 71 with the driven bevel gear 72 allows the rotation of the electric motor 40 to be transmitted to the drive sprocket 38 connected to the outer member 242.

The outer member 242 transmits the net force of a human force (pedaling force) transmitted to the linking shaft 231 and an assistance force generated by the electric motor 40 to the drive sprocket 38. The outer member 242 serves as a net force output shaft that outputs a net force obtained by combining the human force input through the one-way clutch 240 and the assistance force input through the driven bevel gear 72. The rotating shaft 230 includes the net force output shaft. The rotating shaft 230 serves as the output shaft of the drive unit 30 that outputs the human force and the assistance force generated by the electric motor 40.

As described above, the second speed reducer 70 includes the drive bevel gear 71, to which the rotation of the power transmission 60 is transmitted, and the driven bevel gear 72, to which the rotation of the drive bevel gear 71 is transmitted. The drive unit 30 includes a coupling 80 that transmits the rotation of the power transmission 60 to a rotating shaft 73 of the drive bevel gear 71. By the use of the coupling 80, an axial misalignment between the power transmission 60 and the rotating shaft 73 of the drive bevel gear 71 can be accommodated. In this example, a protrusion of a lower portion of the outer member 62 of the power transmission 60 is fitted with a recess of an upper portion of the coupling 80, which allows the coupling 80 to rotate along with the outer member 62. The rotating shaft 73 is fitted with an inner periphery of the coupling 80, which allows the rotating shaft 73 to rotate along with the coupling 80.

The second housing 120 supports the rotating shaft 73 with a bearing 221 interposed therebetween. The second housing 120 also supports the coupling 80 with a bearing 222 interposed therebetween. In other words, the second housing 120 further supports the rotating shaft 73 with the bearing 222 and the coupling 80 interposed therebetween. The rotating shaft 73 is not directly supported by the two bearings 221 and 222, and is supported by the second housing 120 with the coupling 80 interposed therebetween. Because the coupling 80 is disposed between the bearing 222 and the rotating shaft 73, an increase in a size of the drive unit 30 in the direction D1 of the axis of rotation can be reduced, in spite of providing the coupling 80.

As described above, the housing 31 of this example embodiment includes the single cylindrical first housing 110. The single cylindrical first housing 110 directly supports the first speed reducer 50 and the power transmission 60 without any housing other than the first housing 110 being interposed therebetween. In this example embodiment, the term "directly support" used with respect to a housing and a member is intended to encompass the situation that the housing supports the member with a bearing interposed therebetween. The first speed reducer 50 and the power transmission 60 are both supported by the same single first housing 110. As a result, an axial misalignment between the first speed reducer 50 and the power transmission 60 can be reduced. By reducing that axial misalignment, power transmission efficiency can be improved, and noise and vibration can be reduced. By providing such a structure in which the axial misalignment is reduced, it is no longer necessary to increase the design value of backlash, resulting in a further improvement in power transmission efficiency and a further reduction in noise and vibration.

Figure 6:
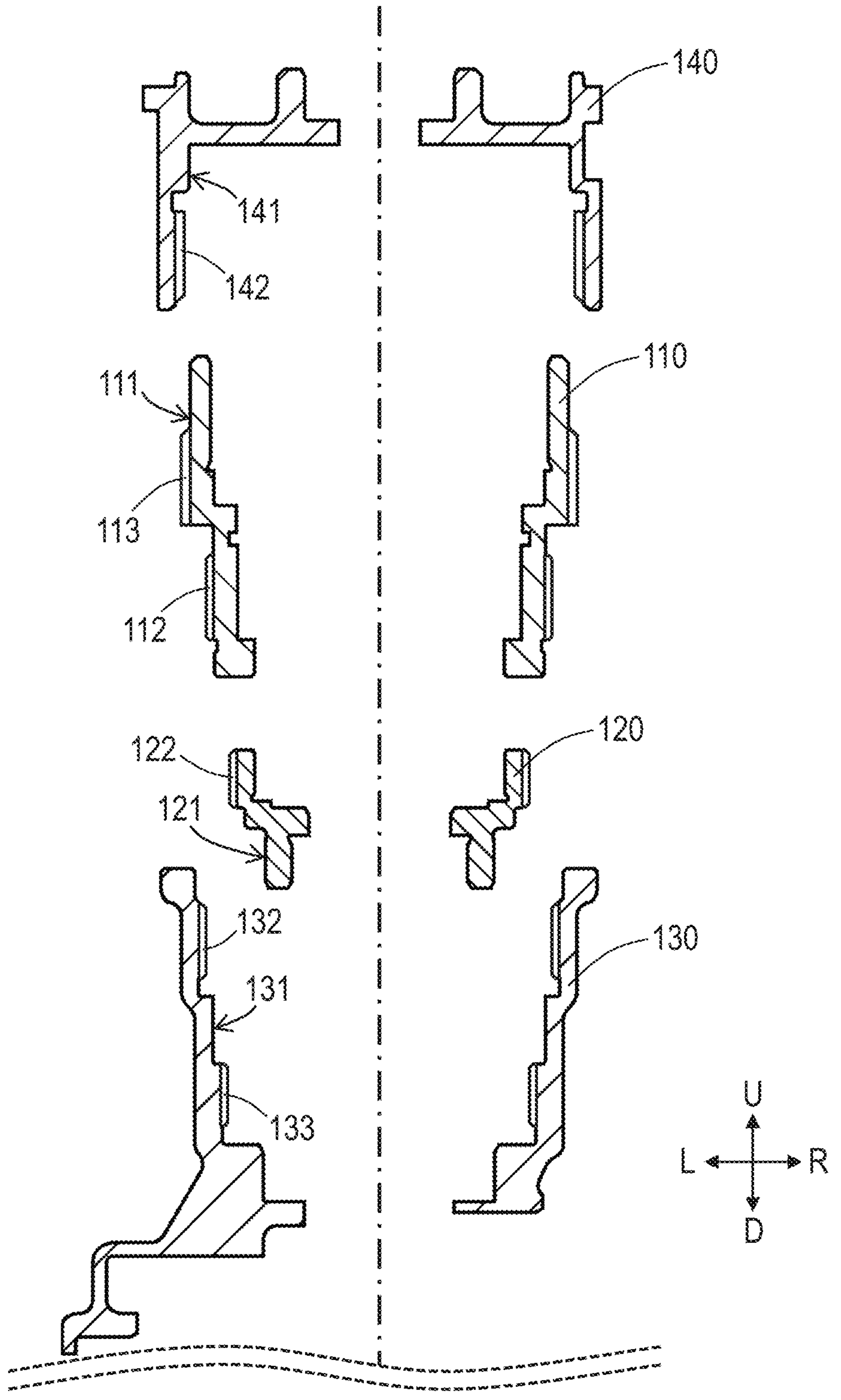
FIG. 6 is a cross-sectional view illustrating a first housing 110, a second housing 120, a third housing 130, and a fourth housing 140 according to an example embodiment of the present invention.
Figure 7:
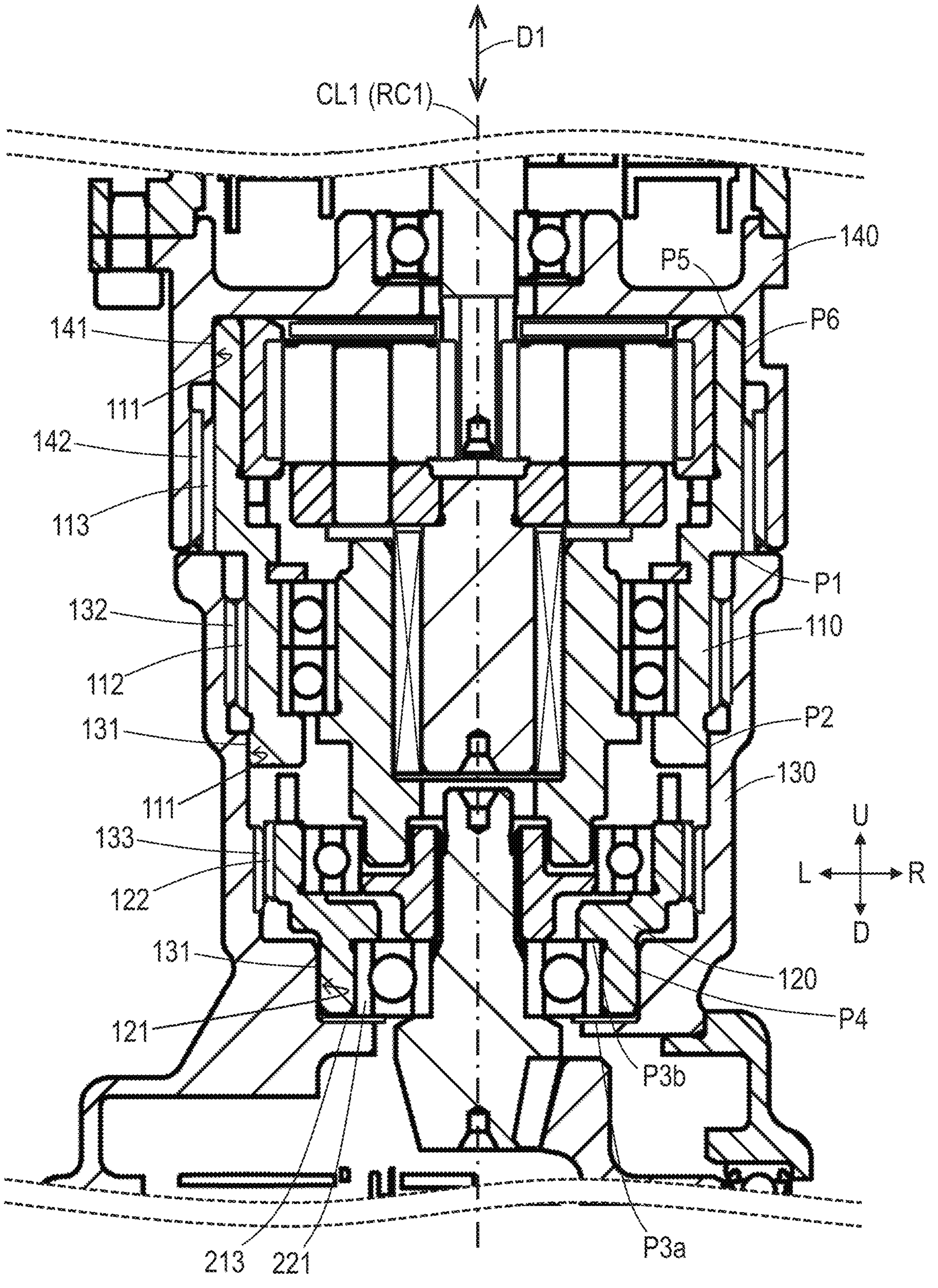
FIG. 7 is an enlarged cross-sectional view illustrating a portion of an internal structure of a drive unit 30 according to an example embodiment of the present invention.

Next, the first housing 110, the second housing 120, the third housing 130, and the fourth housing 140 will be described. FIG. 6 is a cross-sectional view illustrating the first housing 110, the second housing 120, the third housing 130, and the fourth housing 140. FIG. 6 does not illustrate a lower portion of the third housing 130. FIG. 7 is an enlarged cross-sectional view illustrating a portion of the internal structure of the drive unit 30.

As described above, the first to fourth housings 110 to 140 each have a tubular shape. A lower portion of the first housing 110 is disposed in the third housing 130. A male threaded portion 112 is provided at a portion of an outer periphery 111 of the first housing 110. A female threaded portion 132 is provided at a portion of an inner periphery 131 of the third housing 130. When the male threaded portion 112 of the first housing 110 is engaged with the female threaded portion 132 of the third housing 130, the first housing 110 and the third housing 130 are connected together. By fixing the first housing 110 and the third housing 130 together using the male threaded portion 112 and the female threaded portion 132, the number of fastening devices such bolts that are exposed from the outer surface of the drive unit 30 can be reduced, resulting in a decrease in the unevenness of the outer surface of the drive unit 30. Because the unevenness of the outer surface of the drive unit 30 is reduced, the flexibility of design of the body frame 2 of the electric power assisted bicycle 1, on which the drive unit 30 is mounted, can be improved.

The first housing 110 and the third housing 130 are in contact with each other in the direction D1 of the axis of rotation at a position P1 (FIG. 7). The contact at the position P1 can prevent the male threaded portion 112 from advancing beyond the female threaded portion 132. As a result, the first housing 110 and the third housing 130 can be located in the direction D1 of the axis of rotation.

The first housing 110 and the third housing 130 include, at a position P2, a bell-and-spigot-joint structure in which a portion of the outer periphery 111 of the first housing 110 is fitted with a portion of the inner periphery 131 of the third housing 130. As a result, a positional misalignment between the first housing 110 and the third housing 130 can be reduced. An inner peripheral surface of the third housing 130 supports an outer peripheral surface of the first housing 110 without any housing other than the third housing 130 being interposed therebetween.

The second housing 120 is disposed in the third housing 130. A male threaded portion 122 is provided at a portion of an outer periphery 121 of the second housing 120. A female threaded portion 133 is provided at a portion of the inner periphery 131 of the third housing 130. When the male threaded portion 122 is engaged with the female threaded portion 133, the second housing 120 and the third housing 130 are connected together. By fixing the second housing 120 and the third housing 130 together using the male threaded portion 122 and the female threaded portion 133, the number of fastening devices such as bolts that are exposed from the outer surface of the drive unit 30 can be reduced, so that the unevenness of the outer surface of the drive unit 30 can be reduced.

The third housing 130 is in contact with a lower end portion of the bearing 221 at a position P3*a* with a shim 213 interposed therebetween. The second housing 120 is in contact with an upper end portion of the bearing 221 at a position P3*b*. These contacts can prevent the male threaded portion 122 from advancing beyond the female threaded portion 133. As a result, the second housing 120 and the third housing 130 can be located in the direction D1 of the axis of rotation.

The second housing 120 and the third housing 130 have a bell-and-spigot-joint structure in which a portion of the outer periphery 121 of the second housing 120 is fitted with a portion of the inner periphery 131 of the third housing 130 at a position P4. As a result, a positional misalignment between the second housing 120 and the third housing 130 can be reduced.

An upper portion of the first housing 110 is disposed in the fourth housing 140. A male threaded portion 113 is provided at a portion of the outer periphery 111 of the first housing 110. A female threaded portion 142 is provided at a portion of an inner periphery 141 of the fourth housing 140. The first housing 110 and the fourth housing 140 are connected together by the male threaded portion 113 being engaged with the female threaded portion 142. By fixing the first housing 110 and the fourth housing 140 together using the male threaded portion 113 and the female threaded portion 142, the number of fastening devices such as bolts that are exposed from the outer surface of the drive unit 30 can be reduced, so that the unevenness of the outer surface of the drive unit 30 can be reduced.

The first housing 110 is in contact with the fourth housing 140 in the direction D1 of the axis of rotation at a position P5. The contact at the position P5 can prevent the male threaded portion 113 from advancing beyond the female threaded portion 142. As a result, the first housing 110 and the fourth housing 140 can be located in the direction D1 of the axis of rotation.

The first housing 110 and the fourth housing 140 have a bell-and-spigot-joint structure in which a portion of the outer periphery 111 of the first housing 110 is fitted with a portion of the inner periphery 141 of the fourth housing 140 at a position P6. As a result, a positional misalignment between the first housing 110 and the fourth housing 140 can be reduced.

For the fourth housing 140 and the fifth housing 150, a male threaded portion may be provided at an outer periphery of one of these portions, and a female threaded portion may be provided at an inner periphery of the other portion, and the fourth housing 140 and the fifth housing 150 may be connected together by the male threaded portion being engaged with the female threaded portion. As a result, the number of fastening devices such bolts that are exposed from the outer surface of the drive unit 30 can be reduced, resulting in a decrease in the unevenness of the outer surface of the drive unit 30. Alternatively, the fourth housing 140 and the fifth housing 150 may have a bell-and-spigot-joint structure in which a portion of an outer periphery of one of these portions is fitted with a portion of an inner periphery of the other portion. In addition to the above housings, other housings may be similarly connected together. Specifically, a male threaded portion may be provided at an outer periphery of one of two housings, and a female threaded portion may be provided at an inner periphery of the other housing, and these housings may be connected together by the male threaded portion being engaged with the female threaded portion. Alternatively, two housings may have a bell-and-spigot-joint structure in which a portion of an outer periphery of one housing is fitted with a portion of an inner periphery of the other housing.

In this example embodiment, the single cylindrical first housing 110 directly supports the first speed reducer 50 and the power transmission 60 without any housing other than the first housing 110 being interposed therebetween. As described above, in this example embodiment, the term "directly support" used with respect to a housing and a member is intended to encompass the situation that the housing supports the member with a bearing interposed therebetween. The single cylindrical second housing 120 directly supports the second speed reducer 70 without any housing other than the second housing 120 being interposed therebetween. The single cylindrical third housing 130 supports both of the first housing 110 and the second housing 120 without any housing other than the third housing 130 being interposed therebetween. The first housing 110, which supports the power transmission 60, and the second housing 120, which supports the second speed reducer 70, are supported by the same single third housing 130. As a result, an axial misalignment between the power transmission 60 and the second speed reducer 70 can be reduced. The third housing 130 includes a bell-and-spigot-joint structure between itself and each of the first housing 110 and the second housing 120. As a result, an axial misalignment between the power transmission 60 and the second speed reducer 70 can be reduced.

As illustrated in FIG. 5, in the drive unit 30, a thrust washer 211 is provided between the planet gear 53 of the first speed reducer 50 and the fourth housing 140 in the direction D1 of the axis of rotation. Because the thrust washer 211 is provided, a frictional force that acts on the planet gear 53 when the planet gear 53 moves upward can be reduced, resulting in an improvement in mechanical efficiency. In addition, the amounts of wear of the planet gear 53 and the fourth housing 140 can be reduced.

The drive unit 30 further includes a thrust washer 212 between the planet carrier 54 and the power transmission 60. By providing the thrust washer 212, a frictional force acting on the planet carrier 54 and the power transmission 60 can be reduced even when there is a difference in relative rotational speed between the planet carrier 54 and the power transmission 60. As a result, the loss of a human force can be reduced when the electric motor 40 is not generating an assistance force.

Figure 8:
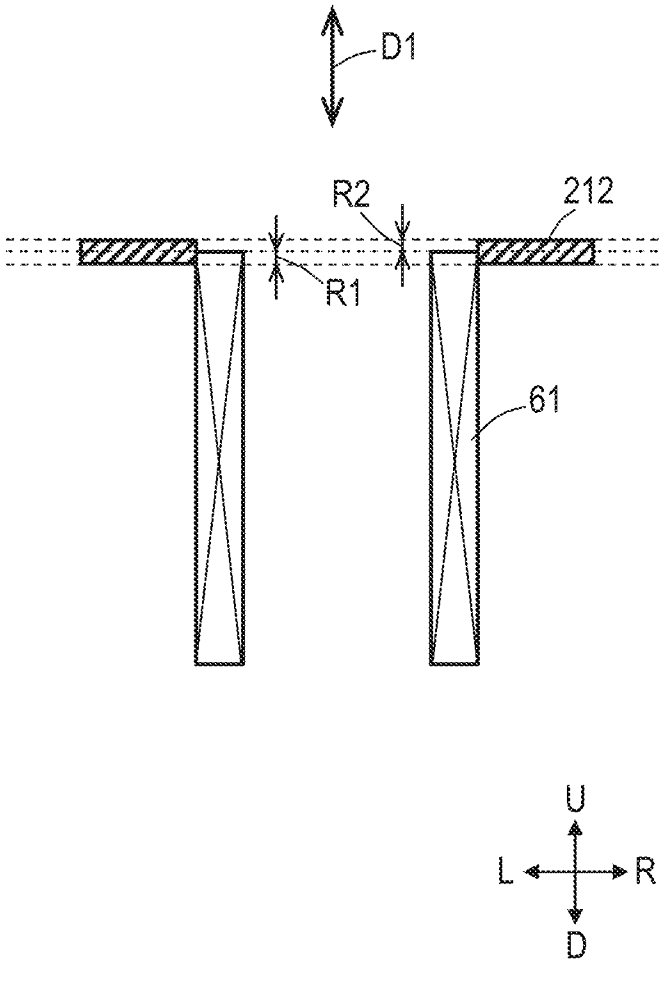
FIG. 8 is a cross-sectional view illustrating a one-way clutch mechanism 61 of a power transmission 60 and a thrust washer 212 according to an example embodiment of the present invention.

FIG. 8 is a cross-sectional view illustrating the one-way clutch mechanism 61 of the power transmission 60 and the thrust washer 212. A portion of the thrust washer 212 overlaps the one-way clutch mechanism 61 as viewed in a direction (left-right direction) perpendicular to the direction D1 of the axis of rotation. For example, in a range R1, the thrust washer 212 overlaps the one-way clutch mechanism 61. As a result, even in the case in which the thrust washer 212 is provided, an increase in the size of the drive unit 30 in the direction D1 of the axis of rotation can be reduced.

In a range R2, the thrust washer 212 does not overlap the one-way clutch mechanism 61. As a result, contact between the one-way clutch mechanism 61 and the planet carrier 54 can be reduced.

In addition, the first housing 110 supports the one-way clutch mechanism 61 with the two bearings 223 and 224, which are disposed in the direction D1 of the axis of rotation, interposed therebetween. A center position between the two bearings 223 and 224 in the direction D1 of the axis of rotation coincides with a center position (position through which a line C1 passes) of the one-way clutch mechanism 61 in the direction D1 of the axis of rotation. As a result, the one-way clutch mechanism 61 can be stably supported using the two bearings 223 and 224, resulting in a reduction in the loss of a drive torque, and an increase in the life of the one-way clutch mechanism 61. Even in the case in which the bearings 223 and 224 are spaced apart from each other, if the center position between the two bearings 223 and 224 coincides with the center position (position through which the line C1 passes) of the one-way clutch mechanism 61 in the direction D1 of the axis of rotation, the one-way clutch mechanism 61 can be stably supported.

It should be noted that the first housing 110 may support the one-way clutch mechanism 61 with a single bearing interposed therebetween. In that case, a center position of that single bearing in the direction D1 of the axis of rotation is set so as to coincide with the center position of the one-way clutch mechanism 61 in the direction D1 of the axis of rotation. As a result, the one-way clutch mechanism 61 can be stably supported using a single bearing, resulting in a reduction in the loss of a drive torque, and an increase in the life of the one-way clutch mechanism 61.

Furthermore, as illustrated in FIG. 5, the shim 213 is provided between a lower end portion of the second housing 120 and the third housing 130 in the direction D1 of the axis of rotation. By changing the thickness of the shim 213, the position of the drive bevel gear 71 in the direction D1 of the axis of rotation can be adjusted.

The first speed reducer 50, which is supported by the first housing 110, may include a trochoidal gear. The speed reducer using a trochoidal gear is, for example, a CYCLO (registered trademark) speed reducer.

Figure 9:
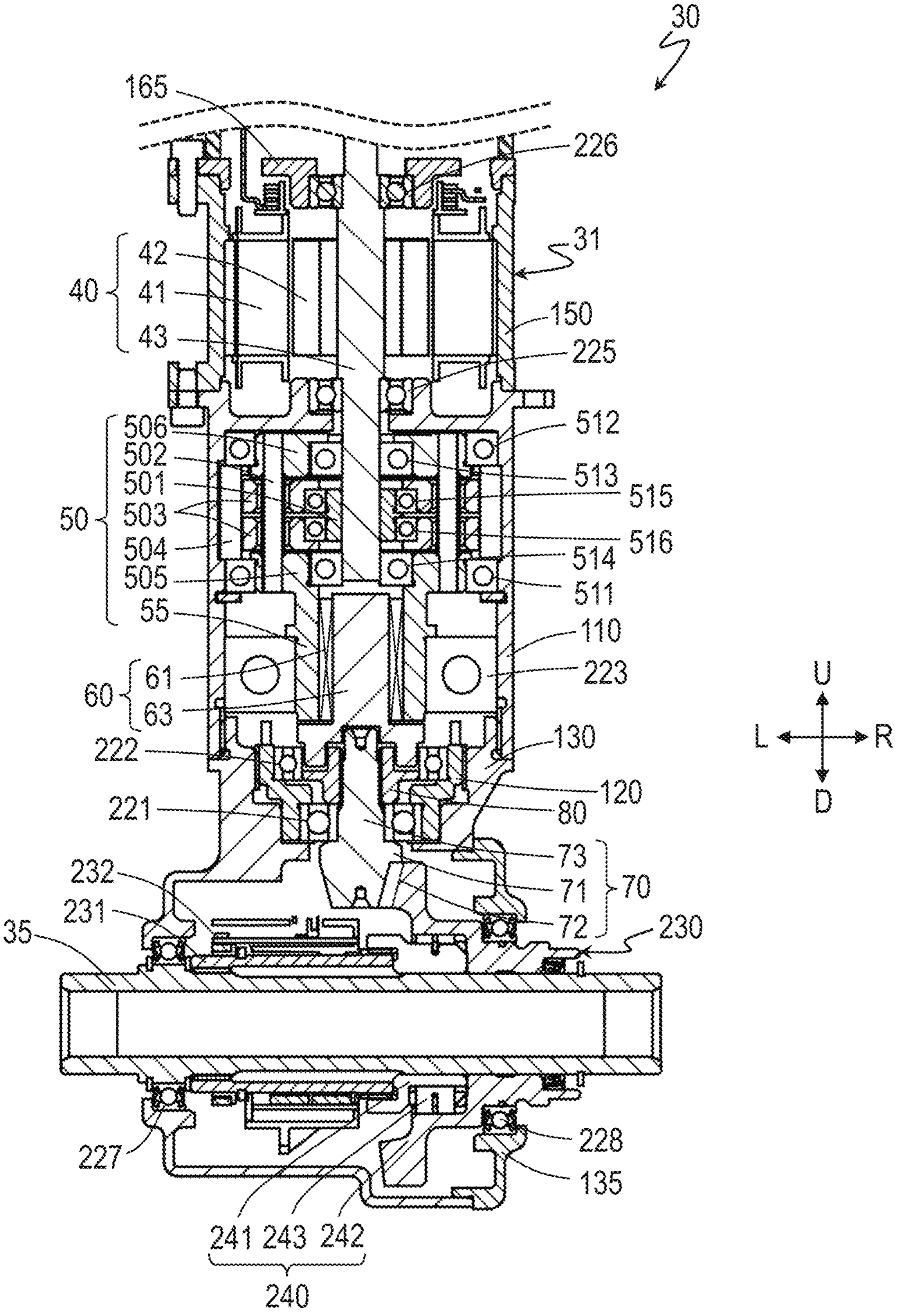
FIG. 9 is a cross-sectional view illustrating another example of an internal structure of a drive unit 30 according to an example embodiment of the present invention.

FIG. 9 is a cross-sectional view illustrating an internal structure of the drive unit 30 that includes a speed reducer using a trochoidal gear as the first speed reducer 50. FIG. 9 does not illustrate an upper portion of the drive unit 30. In the example illustrated in FIG. 9, the first housing 110 includes the configuration of the fourth housing 140 (FIG. 4). The first housing 110 supports the first speed reducer 50 and the power transmission 60.

The first speed reducer 50 illustrated in FIG. 9 includes an eccentric body 501, an inner pin 502, a curved plate (planet gear) 503, an outer pin 504, and support members 505 and 506 that support the inner pin 502. The outer pin 504 is supported by the first housing 110. The inner pin 502 and the outer pin 504 may have a pin roller structure including a bearing. The bearing is, for example, but not limited to, a slide bearing or a rolling bearing. The structure of the speed reducer using a trochoidal gear is known and therefore is not herein described in detail.

The first housing 110 supports the outer pin 504, and also supports the support members 505 and 506 with bearings 511 and 512 interposed therebetween. The support members 505 and 506 support the output shaft 43 of the electric motor 40 with bearings 513 and 514 interposed therebetween. The curved plate 503 supports the eccentric body 501 with bearings 515 and 516 interposed therebetween.

The eccentric body 501 is provided at a lower portion of the output shaft 43 of the electric motor 40. Power is transmitted from the output shaft 43 to the eccentric body 501 using, for example, a key groove, spline, or the like. The output shaft 43 of the electric motor 40 serves as the input shaft of the first speed reducer 50. The output shaft 55 extends downward from the support member 505. The output shaft 43 and the output shaft 55 are coaxial.

The power transmission 60, to which the rotation of the output shaft 55 is transmitted, is located below the first speed reducer 50. In the example illustrated in FIG. 9, the output shaft 55 is an outer member that is disposed on an outer periphery of the one-way clutch mechanism 61. The first housing 110 supports the outer member 55 with the bearing 223 interposed therebetween. Thus, the first housing 110 supports the power transmission 60 with the bearing 223 interposed therebetween.

An inner periphery of the output shaft 55 is fixed to the outer periphery of the one-way clutch mechanism 61. An inner member 63 that is disposed on an inner periphery of the one-way clutch mechanism 61 serves as the output shaft of the power transmission 60. An outer periphery of the inner member 63 is fixed to the inner periphery of the one-way clutch mechanism 61. The second speed reducer 70, to which the rotation of the power transmission 60 is transmitted, is disposed below the power transmission 60. The rotation of the inner member 63 of the power transmission 60 is transmitted to the rotating shaft 73 of the drive bevel gear 71 through the coupling 80.

In the example illustrated in FIG. 9, the single cylindrical first housing 110 also directly supports both of the first speed reducer 50 and the power transmission 60 without any housing other than the first housing 110 being interposed therebetween. As a result, an axial misalignment between the first speed reducer 50 and the power transmission 60 can be reduced.

In the above example embodiments, the second speed reducer 70 includes a bevel gear. The second speed reducer 70 is not limited to such a configuration. For example, the second speed reducer 70 may include a hypoid gear or a worm gear. In that case, the direction D1 of the axis of rotation of the electric motor 40 may not be perpendicular or substantially perpendicular to the direction of the axis of rotation of the pedal crank shaft 35.

In the above example embodiments, the drive unit 30 is disposed at the down tube 12. The present invention is not limited to this. The drive unit 30 may, for example, be disposed at the seat tube 16. The battery unit 20 may, for example, be disposed at the top tube 14 or the seat tube 16.

In the above example embodiments, a two-wheel electric power assisted bicycle has been described as an example of the electric power assisted bicycle 1. The present invention is not limited to this. For example, the electric power assisted bicycle 1 may be an electric power assisted bicycle having three or more wheels.

In the above example embodiments, the drive wheel to which a human force generated by the rider pushing the pedals and an assistance force generated by the electric motor are transmitted is the rear wheel. The present invention is not limited to this. The human force and assistance force may be transmitted to the front wheel or both of the front and rear wheels, depending on the type the electric power assisted bicycle. The present invention may be applied to an electric power assisted bicycle in which a hub motor is provided at the front wheel.

In the above example embodiments, the vehicle is an electric power assisted bicycle. Alternatively, the vehicle may be another vehicle. The present invention is preferably applied to vehicles for which a reduction in size of a drive unit is required.

In the foregoing description, an illustrative example embodiments of the present invention have been described. The present description discloses drive units and bicycles including the following structure.

A drive unit 30 for a bicycle 1 includes an electric motor 40; a housing 31 to accommodate the electric motor 40; a pedal crank shaft 35 extending through the housing 31 with a direction of an axis of rotation thereof intersecting with a direction D1 of an axis of rotation of the electric motor 40; a first speed reducer 50 including an input shaft and an output shaft coaxial with each other to reduce rotation transmitted from the electric motor 40; a power transmission 60 to which a rotation of the output shaft of the first speed reducer 50 is transmitted; and a second speed reducer 70 to change a direction of the axis of rotation transmitted from the power transmission 60, and to reduce the speed of the rotation of the power transmission 60, wherein the housing 31 includes a plurality of housings including a single cylindrical first housing 110, and the single cylindrical first housing 110 supports the first speed reducer 50 and the power transmission 60 without any housing other than the first housing 110 being interposed therebetween.

According to an example embodiment of the present invention, the first speed reducer 50, to which the rotation of the electric motor 40 is transmitted, and the power transmission 60, to which the rotation of the first speed reducer 50 is transmitted, are both supported by the same single cylindrical first housing 110. As a result, an axial misalignment between the first speed reducer 50 and the power transmission 60 can be reduced. By reducing that axial misalignment, power transmission efficiency can be improved, and noise and vibration can be reduced. Such a structure having a reduced axial misalignment eliminates the need of increasing the design value of backlash, resulting in a further improvement in power transmission efficiency and a further reduction in noise and vibration.

In a drive unit 30 described above, the power transmission 60 includes a one-way clutch mechanism 61.

Because the first speed reducer 50 and the power transmission 60 are both supported by the same single cylindrical first housing 110, an axial misalignment of the one-way clutch mechanism 61 can be reduced.

In a drive unit 30 described above, the power transmission 60 is able to transmit rotation transmitted from the output shaft of the first speed reducer 50 to the second speed reducer 70 without a reduction in the rotation.

The power transmission 60 can be used to transmit the rotation of the first speed reducer 50 to the second speed reducer 70.

In a drive unit 30 described above, the plurality of housings include a single cylindrical second housing 120 and a single cylindrical third housing 130, wherein the single cylindrical second housing 120 supports the second speed reducer 70 without any housing other than the second housing 120 being interposed therebetween, and the single cylindrical third housing 130 supports the first housing 110 and the second housing 120 without any housing other than the third housing 130 being interposed therebetween.

The first housing 110, which supports the power transmission 60, and the second housing 120, which supports the second speed reducer 70, are supported by the same third housing 130. As a result, an axial misalignment between the power transmission 60 and the second speed reducer 70 can be reduced.

In a drive unit 30 described above, the first housing 110 and the third housing 130 have a bell-and-spigot-joint structure in which at least a portion of an outer periphery 111 of the first housing 110 is fitted with a portion of an inner periphery 131 of the third housing 130, and the second housing 120 and the third housing 130 have a bell-and-spigot-joint structure in which at least a portion of an outer periphery 121 of the second housing 120 is fitted with another portion of the inner periphery 131 of the third housing 130.

The third housing 130 includes a bell-and-spigot-joint structure between itself and each of the first housing 110 and the second housing 120. As a result, an axial misalignment between the power transmission 60 and the second speed reducer 70 can be reduced.

In a drive unit 30 described above, a male threaded portion 112 is provided at a portion of an outer periphery 111 of the first housing 110, a female threaded portion 132 is provided at a portion of an inner periphery 131 of the third housing 130, and the first housing 110 and the third housing 130 are connected together by the male threaded portion 112 of the first housing 110 being engaged with the female threaded portion 132 of the third housing 130.

Fastening devices such as bolts that are exposed from an outer surface of the drive unit 30 can be reduced, so that the unevenness of the outer surface of the drive unit 30 can be reduced. As a result, the design flexibility of a frame 2 of the bicycle 1, on which the drive unit 30 is mounted, can be improved.

In a drive unit 30 described above, the first housing 110 and the third housing 130 are in contact with each other in the direction D1 of the axis of rotation of the electric motor 40.

As a result, the first housing 110, at which the male threaded portion 112 is provided, and the third housing 130, at which the female threaded portion 132 is provided, can be located in the direction D1 of the axis of rotation of the electric motor 40.

In a drive unit 30 described above, a male threaded portion 122 is provided at a portion of an outer periphery 121 of the second housing 120, a female threaded portion 133 is provided at a portion of an inner periphery 131 of the third housing 130, and the second housing 120 and the third housing 130 are connected together by the male threaded portion 122 of the second housing 120 being engaged with the female threaded portion 133 of the third housing 130.

Fastening devices such as bolts that are exposed from an outer surface of the drive unit 30 can be reduced, so that the unevenness of the outer surface of the drive unit 30 can be reduced. As a result, the design flexibility of a frame 2 of the bicycle 1, on which the drive unit 30 is mounted, can be improved.

In a drive unit 30 described above, the plurality of housings include a single cylindrical fourth housing 140, the single cylindrical fourth housing 140 supports the input shaft 43 of the first speed reducer 50 without any housing other than the fourth housing 140 being interposed therebetween, and the first housing 110 and the fourth housing 140 have a bell-and-spigot-joint structure in which at least a portion of an outer periphery 111 of the first housing 110 is fitted with at least a portion of an inner periphery 141 of the fourth housing 140.

The first housing 110 and the fourth housing 140 have a bell-and-spigot-joint structure. As a result, an axial misalignment between the input shaft of the first speed reducer 50 and the other elements of the first speed reducer 50 can be reduced.

In a drive unit 30 described above, a male threaded portion 113 is provided at a portion of an outer periphery 111 of the first housing 110, a female threaded portion 142 is provided at a portion of an inner periphery 141 of the fourth housing 140, and the first housing 110 and the fourth housing 140 are connected together by the male threaded portion 113 of the first housing 110 being engaged with the female threaded portion 142 of the fourth housing 140.

Fastening devices such as bolts that are exposed from an outer surface of the drive unit 30 can be reduced, so that the unevenness of the outer surface of the drive unit 30 can be reduced. As a result, the design flexibility of a frame 2 of the bicycle 1, on which the drive unit 30 is mounted, can be improved.

In a drive unit 30 described above, the first housing 110 and the fourth housing 140 are in contact with each other in the direction D1 of the axis of rotation of the electric motor 40.

As a result, the first housing 110, at which the male threaded portion 113 is provided, and the fourth housing 140, at which the female threaded portion 142 is provided, can be located in the direction D1 of the axis of rotation of the electric motor 40.

In a drive unit 30 described above, the first speed reducer 50 includes a planetary gear mechanism, the first housing 110 supports a ring gear 52 of the planetary gear mechanism, and the drive unit 30 further includes a thrust washer 211 between a planet gear 53 of the planetary gear mechanism and the fourth housing 140 in the direction D1 of the axis of rotation of the electric motor 40.

As a result, when the planet gear 53 is moved in the direction D1 of the axis of rotation of the electric motor 40, a frictional force acting on the planet gear 53 can be reduced, resulting in an improvement in mechanical efficiency. In addition, the amount of friction between the planet gear 53 and the fourth housing 140 can be reduced.

In a drive unit 30 described above, the first speed reducer 50 includes a planetary gear mechanism, the first housing 110 supports a ring gear 52 of the planetary gear mechanism, and the drive unit 30 further includes a thrust washer 212 between a planet carrier 54 of the planetary gear mechanism and the power transmission 60 in the direction D1 of the axis of rotation of the electric motor 40.

Even when a difference in relative rotational speed occurs between the planet carrier 54 and the power transmission 60, a frictional force generated between the planet carrier 54 and the power transmission 60 can be reduced. As a result, the loss of a human force can be reduced when the electric motor 40 is not generating an assistance force.

In a drive unit 30 described above, a portion of the thrust washer 212 overlaps the one-way clutch mechanism 61 in a plan view of the drive unit 30, or as viewed in a direction perpendicular to the direction D1 of the axis of rotation of the electric motor 40.

As a result, a size of the drive unit 30 in the direction D1 of the axis of rotation of the electric motor 40 can be reduced.

In a drive unit 30 described above, the first housing 110 supports the one-way clutch mechanism 61 with bearings 223 and 224 interposed therebetween, and a center position between the bearings 223 and 224 in the direction D1 of the axis of rotation of the electric motor 40 coincides with a center position of the one-way clutch mechanism 61 in the direction D1 of the axis of rotation of the electric motor 40.

As a result, the one-way clutch mechanism 61 can be stably supported, and therefore, the loss of a drive torque can be reduced, and the life of the one-way clutch mechanism 61 can be extended.

In a drive unit 30 described above, the second speed reducer 70 includes a drive bevel gear 71 to which the rotation of the power transmission 60 is transmitted, and a driven bevel gear 72 to which the rotation of the drive bevel gear 71 is transmitted, and the second housing 120 supports a rotating shaft 73 of the drive bevel gear 71 without any housing other than the second housing 120 being interposed therebetween.

The direction of the axis of rotation transmitted from the power transmission 60 can be changed using the bevel gears 71 and 72, and the speed of the rotation can be reduced.

The drive unit 30 described above may further include a shim 213 between a lower end portion of the second housing 120 and the third housing 130 in the direction D1 of the axis of rotation of the electric motor 40.

A position of the drive bevel gear 71 can be adjusted using the shim 213.

The drive unit 30 described above may further include a coupling 80 to transmit the rotation of the power transmission 60 to the rotating shaft 73 of the drive bevel gear 71.

An axial misalignment between the power transmission 60 and the rotating shaft 73 of the drive bevel gear 71 can be accommodated by the coupling 80.

In a drive unit 30 described above, the second housing 120 supports the rotating shaft 73 of the drive bevel gear 71 with a first bearing 221 interposed therebetween, and supports the coupling 80 with a second bearing 222 interposed therebetween, and the second housing 120 further supports the rotating shaft 73 of the drive bevel gear 71 with the second bearing 222 and the coupling 80 interposed therebetween.

In the structure in which the coupling 80 is provided, a size of the drive unit 30 in the direction D1 of the axis of rotation of the electric motor 40 can be reduced.

A bicycle 1 may include any drive unit 30 described above.

In the bicycle 1 thus described, noise and vibration generated in the drive unit 30 can be reduced.

In a bicycle 1 described above, the drive unit 30 is attached to a frame 2 of the bicycle 1 at a location farther forward than a rear end portion 31Re of a wall portion 31*w* around the pedal crank shaft 35 of the housing 31.

As a result, the rear-center length of the bicycle 1 (the distance between the pedal crank shaft 35 and the rear wheel hub) can be reduced.

In a bicycle 1 described above, the drive unit 30 is attached to a frame 2 of the bicycle 1 at a location farther rearward than a rear end portion 31Re of a wall portion 31*w* around the pedal crank shaft 35 of the housing 31, and farther forward than a rear wheel 7 of the bicycle 1.

The drive unit 30 may be attached to the frame 2 of the bicycle 1 at a plurality of locations. A fastening portion may be located farther forward than the pedal crank shaft 35 to fix the drive unit 30 to the frame 2 of the bicycle 1. In that case, another fastening portion is located farther rearward than the rear end portion 31Re of the wall portion 31*w* around the pedal crank shaft 35 of the housing 31, to fix the drive unit 30 to the frame 2 of the bicycle 1. As a result, the distance between these fastening portions can be increased, resulting in an increase in mounting rigidity.

A drive unit 30 for a bicycle 1 includes an electric motor 40; a housing 31 to accommodate the electric motor 40; a pedal crank shaft 35 extending through the housing 31 with a direction of an axis of rotation thereof intersecting with a direction D1 of an axis of rotation of the electric motor 40; a first speed reducer 50 including an input shaft and an output shaft that are coaxial with each other to reduce rotation transmitted from the electric motor 40; a power transmission 60 to which a rotation of the output shaft of the first speed reducer 50 is transmitted; and a second speed reducer 70 to change a direction of an axis of rotation transmitted from the power transmission 60, and to reduce the speed of the rotation of the power transmission 60, wherein the housing 31 includes a single cylindrical first housing 110, a single cylindrical second housing 120, and a single cylindrical third housing 130, the single cylindrical first housing 110 supports the power transmission 60 without any housing other than the first housing 110 being interposed therebetween, the single cylindrical second housing 120 supports the second speed reducer 70 without any housing other than the second housing 120 being interposed therebetween, and the single cylindrical third housing 130 supports the first housing 110 and the second housing 120 without any housing other than the third housing 130 being interposed therebetween.

According to an example embodiment of the present invention, the first housing 110, which supports the power transmission 60, and the second housing 120, which supports the second speed reducer 70, are supported by the same single third housing 130. As a result, an axial misalignment between the power transmission 60 and the second speed reducer 70 can be reduced. By reducing that axial misalignment, power transmission efficiency can be improved, and noise and vibration can be reduced. By providing such a structure in which the axial misalignment is reduced, it is no longer necessary to increase the design value of backlash, resulting in a further improvement in power transmission efficiency and a further reduction in noise and vibration.

In a drive unit 30 described above, the first housing 110 and the third housing 130 have a bell-and-spigot-joint structure in which at least a portion of an outer periphery 111 of the first housing 110 is fitted with a portion of an inner periphery 131 of the third housing 130, and the second housing 120 and the third housing 130 have a bell-and-spigot-joint structure in which at least a portion of an outer periphery 121 of the second housing 120 is fitted with another portion of the inner periphery 131 of the third housing 130.

The third housing 130 has a bell-and-spigot-joint structure between itself and each of the first housing 110 and the second housing 120. As a result, an axial misalignment between the power transmission 60 and the second speed reducer 70 can be reduced.

The drive unit 30 described above may further include a coupling 80 to transmit the rotation of the power transmission 60 to the second speed reducer 70, wherein the second housing 120 supports the coupling 80.

The coupling 80 is supported by the second housing 120, which supports the second speed reducer 70. Therefore, in the structure in which the coupling 80 is provided, a size of the drive unit 30 in the direction D1 of the axis of rotation of the electric motor 40 can be reduced.

In a drive unit 30 described above, the third housing 130 supports the pedal crank shaft 35.

As a result, an axial misalignment between the second speed reducer 70 and the pedal crank shaft 35 can be reduced. Example embodiments of the present invention are particularly useful in the field of bicycles and drive units that are mounted on bicycles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit for a bicycle, the drive unit comprising:
an electric motor;
a housing to accommodate the electric motor;
a pedal crank shaft extending through the housing with a direction of an axis of rotation thereof intersecting with a direction of an axis of rotation of the electric motor;
a first speed reducer including an input shaft and an output shaft coaxial with each other to reduce a rotation transmitted from the electric motor;
a power transmission to which a rotation of the output shaft of the first speed reducer is transmitted; and
a second speed reducer to change a direction of an axis of rotation transmitted from the power transmission and to reduce a speed of the rotation from the power transmission; wherein
the housing includes a plurality of housings including a single cylindrical first housing;
the single cylindrical first housing supports the first speed reducer and the power transmission without any housing other than the first housing being interposed therebetween;
the plurality of housings include a single cylindrical second housing and a single cylindrical third housing;
the single cylindrical second housing supports the second speed reducer without any housing other than the second housing being interposed therebetween;
the single cylindrical third housing supports the first housing and the second housing without any housing other than the third housing being interposed therebetween;
the first housing and the third housing have a bell-and-spigot-joint structure in which at least a portion of an outer periphery of the first housing is fitted with a portion of an inner periphery of the third housing; and
the second housing and the third housing have a bell-and-spigot-joint structure in which at least a portion of an outer periphery of the second housing is fitted with another portion of the inner periphery of the third housing.

2. The drive unit according to claim 1, wherein the power transmission includes a one-way clutch.

3. The drive unit according to claim 2, wherein
the first speed reducer includes a planetary gear mechanism;
the first housing supports a ring gear of the planetary gear mechanism; and
the drive unit further comprises a thrust washer between a planet carrier of the planetary gear mechanism and the power transmission in the direction of the axis of rotation of the electric motor.

4. The drive unit according to claim 3, wherein a portion of the thrust washer overlaps the one-way clutch in a plan view of the drive unit, or as viewed in a direction perpendicular to the direction of the axis of rotation of the electric motor.

5. The drive unit according to claim 2, wherein
the first housing supports the one-way clutch with a bearing interposed therebetween; and
a center position of the bearing in the direction of the axis of rotation of the electric motor coincides with a center position of the one-way clutch in the direction of the axis of rotation of the electric motor.

6. The drive unit according to claim 1, wherein the power transmission is able to transmit rotation transmitted from the output shaft of the first speed reducer to the second speed reducer without a reduction in a speed of the rotation.

7. A drive unit for a bicycle, the drive unit comprising:
an electric motor;
a housing to accommodate the electric motor;
a pedal crank shaft extending through the housing with a direction of an axis of rotation thereof intersecting with a direction of an axis of rotation of the electric motor;
a first speed reducer including an input shaft and an output shaft coaxial with each other to reduce a rotation transmitted from the electric motor;
a power transmission to which a rotation of the output shaft of the first speed reducer is transmitted; and
a second speed reducer to change a direction of an axis of rotation transmitted from the power transmission and to reduce a speed of the rotation from the power transmission; wherein
the housing includes a plurality of housings including a single cylindrical first housing;
the single cylindrical first housing supports the first speed reducer and the power transmission without any housing other than the first housing being interposed therebetween;
the plurality of housings include a single cylindrical fourth housing supporting the input shaft of the first speed reducer without any housing other than the fourth housing being interposed therebetween; and
the first housing and the fourth housing have a bell-and-spigot-joint structure in which at least a portion of an outer periphery of the first housing is fitted with at least a portion of an inner periphery of the fourth housing.

8. The drive unit according to claim 7, wherein a male threaded portion is provided at a portion of an outer periphery of the first housing;

a female threaded portion is provided at a portion of an inner periphery of the fourth housing; and the first housing and the fourth housing are connected together by the male threaded portion of the first housing being engaged with the female threaded portion of the fourth housing.

9. The drive unit according to claim 8, wherein the first housing and the fourth housing are in contact with each other in the direction of the axis of rotation of the electric motor.

10. The drive unit according to claim 7, wherein the first speed reducer includes a planetary gear mechanism;

the first housing supports a ring gear of the planetary gear mechanism; and the drive unit further comprises a thrust washer between a planet gear of the planetary gear mechanism and the fourth housing in the direction of the axis of rotation of the electric motor.

11. A bicycle comprising:

the drive unit according to claim 1.

12. The bicycle according to claim 11, wherein the drive unit is attached to a frame of the bicycle at a location farther forward than a rear end portion of a wall around the pedal crank shaft of the housing.

13. The bicycle according to claim 11, wherein the drive unit is attached to a frame of the bicycle at a location farther rearward than a rear end portion of a wall around the pedal crank shaft of the housing, and farther forward than a rear wheel of the bicycle.

14. A drive unit for a bicycle, the drive unit comprising:

an electric motor;

a housing to accommodate the electric motor;

a pedal crank shaft extending through the housing with a direction of an axis of rotation thereof intersecting with a direction of an axis of rotation of the electric motor;

a first speed reducer including an input shaft and an output shaft coaxial with each other to reduce a rotation transmitted from the electric motor;

a power transmission to which a rotation of the output shaft of the first speed reducer is transmitted; and a second speed reducer to change a direction of an axis of rotation transmitted from the power transmission and to reduce a speed of the rotation from the power transmission; wherein the housing includes a plurality of housings including a single cylindrical first housing;

the single cylindrical first housing supports the first speed reducer and the power transmission without any housing other than the first housing being interposed therebetween;

the plurality of housings include a single cylindrical second housing and a single cylindrical third housing;

the single cylindrical second housing supports the second speed reducer without any housing other than the second housing being interposed therebetween;

the single cylindrical third housing supports the first housing and the second housing without any housing other than the third housing being interposed therebetween;

a male threaded portion is provided at a portion of an outer periphery of the first housing;

a female threaded portion is provided at a portion of an inner periphery of the third housing; and the first housing and the third housing are connected together by the male threaded portion of the first housing being engaged with the female threaded portion of the third housing.

15. The drive unit according to claim 14, wherein the first housing and the third housing are in contact with each other in the direction of the axis of rotation of the electric motor.

16. A drive unit for a bicycle, the drive unit comprising:

an electric motor;

a housing to accommodate the electric motor;

a pedal crank shaft extending through the housing with a direction of an axis of rotation thereof intersecting with a direction of an axis of rotation of the electric motor;

a first speed reducer including an input shaft and an output shaft coaxial with each other to reduce a rotation transmitted from the electric motor;

a power transmission to which a rotation of the output shaft of the first speed reducer is transmitted; and a second speed reducer to change a direction of an axis of rotation transmitted from the power transmission and to reduce a speed of the rotation from the power transmission; wherein the housing includes a plurality of housings including a single cylindrical first housing;

the single cylindrical first housing supports the first speed reducer and the power transmission without any housing other than the first housing being interposed therebetween;

the plurality of housings include a single cylindrical second housing and a single cylindrical third housing;

the single cylindrical second housing supports the second speed reducer without any housing other than the second housing being interposed therebetween;

the single cylindrical third housing supports the first housing and the second housing without any housing other than the third housing being interposed therebetween;

a male threaded portion is provided at a portion of an outer periphery of the second housing;

a female threaded portion is provided at a portion of an inner periphery of the third housing; and the second housing and the third housing are connected together by the male threaded portion of the second housing being engaged with the female threaded portion of the third housing.

17. The drive unit according to claim 1, wherein the second speed reducer includes a drive bevel gear to which a rotation of the power transmission is transmitted, and a driven bevel gear to which a rotation of the drive bevel gear is transmitted; and the second housing supports a rotating shaft of the drive bevel gear without any housing other than the second housing being interposed therebetween.

18. The drive unit according to claim 17, further comprising:

a shim between a lower end portion of the second housing and the third housing in the direction of the axis of rotation of the electric motor.

19. The drive unit according to claim 17, further comprising:

a coupling to transmit the rotation of the power transmission to the rotating shaft of the drive bevel gear.

20. A drive unit for a bicycle, the drive unit comprising:

an electric motor;

a housing to accommodate the electric motor;

a pedal crank shaft extending through the housing with a direction of an axis of rotation thereof intersecting with a direction of an axis of rotation of the electric motor;

a first speed reducer including an input shaft and an output shaft coaxial with each other to reduce a rotation transmitted from the electric motor;

a power transmission to which a rotation of the output shaft of the first speed reducer is transmitted; and a second speed reducer to change a direction of an axis of rotation transmitted from the power transmission and to reduce a speed of the rotation from the power transmission; wherein the housing includes a plurality of housings including a single cylindrical first housing;

the single cylindrical first housing supports the first speed reducer and the power transmission without any housing other than the first housing being interposed therebetween;

the plurality of housings include a single cylindrical second housing and a single cylindrical third housing;

the single cylindrical second housing supports the second speed reducer without any housing other than the second housing being interposed therebetween; and the single cylindrical third housing supports the first housing and the second housing without any housing other than the third housing being interposed therebetween;

the second speed reducer includes a drive bevel gear to which a rotation of the power transmission is transmitted, and a driven bevel gear to which a rotation of the drive bevel gear is transmitted;

the second housing supports a rotating shaft of the drive bevel gear without any housing other than the second housing being interposed therebetween:

a coupling to transmit the rotation of the power transmission to the rotating shaft of the drive bevel gear;

the second housing supports the rotating shaft of the drive bevel gear with a first bearing interposed therebetween, and supports the coupling with a second bearing interposed therebetween; and the second housing further supports the rotating shaft of the drive bevel gear with the second bearing and the coupling interposed therebetween.

21. A drive unit for a bicycle, the drive unit comprising:

an electric motor;

a housing to accommodate the electric motor;

a pedal crank shaft extending through the housing with a direction of an axis of rotation thereof intersecting with a direction of an axis of rotation of the electric motor;

a first speed reducer including an input shaft and an output shaft coaxial with each other to reduce a rotation transmitted from the electric motor;

a power transmission to which a rotation of the output shaft of the first speed reducer is transmitted; and a second speed reducer to change a direction of an axis of rotation transmitted from the power transmission, and to reduce a speed of a rotation of the power transmission; wherein the housing includes a single cylindrical first housing, a single cylindrical second housing, and a single cylindrical third housing;

the single cylindrical first housing supports the power transmission without any housing other than the first housing being interposed therebetween;

the single cylindrical second housing supports the second speed reducer without any housing other than the second housing being interposed therebetween;

the single cylindrical third housing supports the first housing without any housing other than the third housing being interposed therebetween; and the single cylindrical third housing supports the second housing without any housing other than the third housing being interposed therebetween.

22. A drive unit for a bicycle, the drive unit comprising:

an electric motor;

a housing to accommodate the electric motor;

a pedal crank shaft extending through the housing with a direction of an axis of rotation thereof intersecting with a direction of an axis of rotation of the electric motor;

a first speed reducer including an input shaft and an output shaft coaxial with each other to reduce rotation transmitted from the electric motor;

a power transmission to which a rotation of the output shaft of the first speed reducer is transmitted; and a second speed reducer to change a direction of an axis of rotation transmitted from the power transmission, and to reduce a speed of a rotation of the power transmission; wherein the housing includes a single cylindrical first housing, a single cylindrical second housing, and a single cylindrical third housing;

the single cylindrical first housing supports the power transmission without any housing other than the first housing being interposed therebetween;

the single cylindrical second housing supports the second speed reducer without any housing other than the second housing being interposed therebetween;

the single cylindrical third housing supports the first housing and the second housing without any housing other than the third housing being interposed therebetween;

the first housing and the third housing have a bell-and-spigot-joint structure in which at least a portion of an outer periphery of the first housing is fitted with a portion of an inner periphery of the third housing; and the second housing and the third housing have a bell-and-spigot-joint structure in which at least a portion of an outer periphery of the second housing is fitted with another portion of the inner periphery of the third housing.

23. The drive unit according to claim 21, further comprising:

a coupling to transmit the rotation of the power transmission to the second speed reducer; wherein the second housing supports the coupling.

24. The drive unit according to claim 21, wherein the third housing supports the pedal crank shaft.

* * * * *